(12) United States Patent
Ozawa

(10) Patent No.: US 12,382,185 B2
(45) Date of Patent: Aug. 5, 2025

(54) VEHICULAR DISPLAY SYSTEM AND IMAGE IRRADIATION DEVICE

(71) Applicant: KOITO MANUFACTURING CO., LTD., Tokyo (JP)

(72) Inventor: Kazuyoshi Ozawa, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 84 days.

(21) Appl. No.: 18/245,279

(22) PCT Filed: Aug. 23, 2021

(86) PCT No.: PCT/JP2021/030776
§ 371 (c)(1),
(2) Date: Mar. 14, 2023

(87) PCT Pub. No.: WO2022/054557
PCT Pub. Date: Mar. 17, 2022

(65) Prior Publication Data
US 2023/0362495 A1 Nov. 9, 2023

(30) Foreign Application Priority Data

Sep. 14, 2020 (JP) .................................. 2020-153909
Nov. 16, 2020 (JP) .................................. 2020-190155

(51) Int. Cl.
*H04N 23/76* (2023.01)
*B60R 1/22* (2022.01)
(Continued)

(52) U.S. Cl.
CPC ............... *H04N 23/76* (2023.01); *B60R 1/22* (2022.01); *H04N 5/272* (2013.01); *H04N 23/11* (2023.01);
(Continued)

(58) Field of Classification Search
None
See application file for complete search history.

(56) References Cited

U.S. PATENT DOCUMENTS 5,001,558 A * 3/1991 Burley ................... H04N 23/11
348/E5.09
6,827,473 B2 12/2004 Kobayashi
(Continued)

FOREIGN PATENT DOCUMENTS

JP 2003-199094 A 7/2003
JP 2003-344801 A 12/2003
(Continued)

OTHER PUBLICATIONS

Extended European Search Report issued in counterpart European application No. 21866517.2, dated Feb. 12, 2024 (10 pages).
(Continued)

*Primary Examiner* — Matthew Yeung
(74) *Attorney, Agent, or Firm* — Osha Bergman Watanabe & Burton LLP

(57) ABSTRACT

A vehicular display system includes: a first lamp that emits near-infrared light; a second lamp that emits visible light; a first camera that captures a first image of an outside of a vehicle irradiated by the first lamp; a second camera that includes an imaging range of the first camera and captures a second image of the outside of the vehicle irradiated by the second lamp; a control unit that generates a third image in which a luminance of pixels of the first image corresponding to pixels of the second image is reduced, based on a luminance of the second image; and a head-up display that displays the third image generated by the control unit.

4 Claims, 15 Drawing Sheets

(51) Int. Cl.
*H04N 5/272* (2006.01)
*H04N 23/11* (2023.01)
*H04N 23/13* (2023.01)
*H04N 23/56* (2023.01)
*H04N 23/90* (2023.01)

(52) U.S. Cl.
CPC ............ *H04N 23/13* (2023.01); *H04N 23/56* (2023.01); *H04N 23/90* (2023.01); *B60R 2300/20* (2013.01); *B60R 2300/304* (2013.01)

(56) References Cited

U.S. PATENT DOCUMENTS

| | | | |
|---|---|---|---|
| 9,774,797 B2* | 9/2017 | Richards | H04N 5/33 |
| 11,118,750 B2* | 9/2021 | Shimada | B60Q 1/14 |
| 2003/0123752 A1* | 7/2003 | Ishii | G06T 5/40 |
| | | | 382/286 |
| 2009/0231874 A1 | 9/2009 | Kishimoto et al. | |
| 2017/0075118 A1* | 3/2017 | Wall | G02B 27/0149 |
| 2019/0285887 A1* | 9/2019 | Yasui | G02B 5/10 |
| 2021/0304428 A1* | 9/2021 | Cao | H04N 13/257 |

FOREIGN PATENT DOCUMENTS

| | | |
|---|---|---|
| JP | 2007-282022 A | 10/2007 |
| JP | 2009-237986 A | 10/2009 |
| JP | 4779780 B2 | 9/2011 |
| JP | 2016-182911 A | 10/2016 |
| JP | 2017-190000 A | 10/2017 |

OTHER PUBLICATIONS

International Search Report in corresponding International Application No. PCT/JP2021/030776, dated Nov. 9, 2021 (5 pages).
Written Opinion in corresponding International Application No. PCT/JP2021/030776, dated Nov. 9, 2021 (4 pages).

\* cited by examiner

FIG. 9
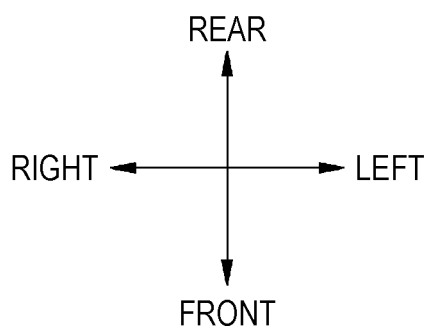
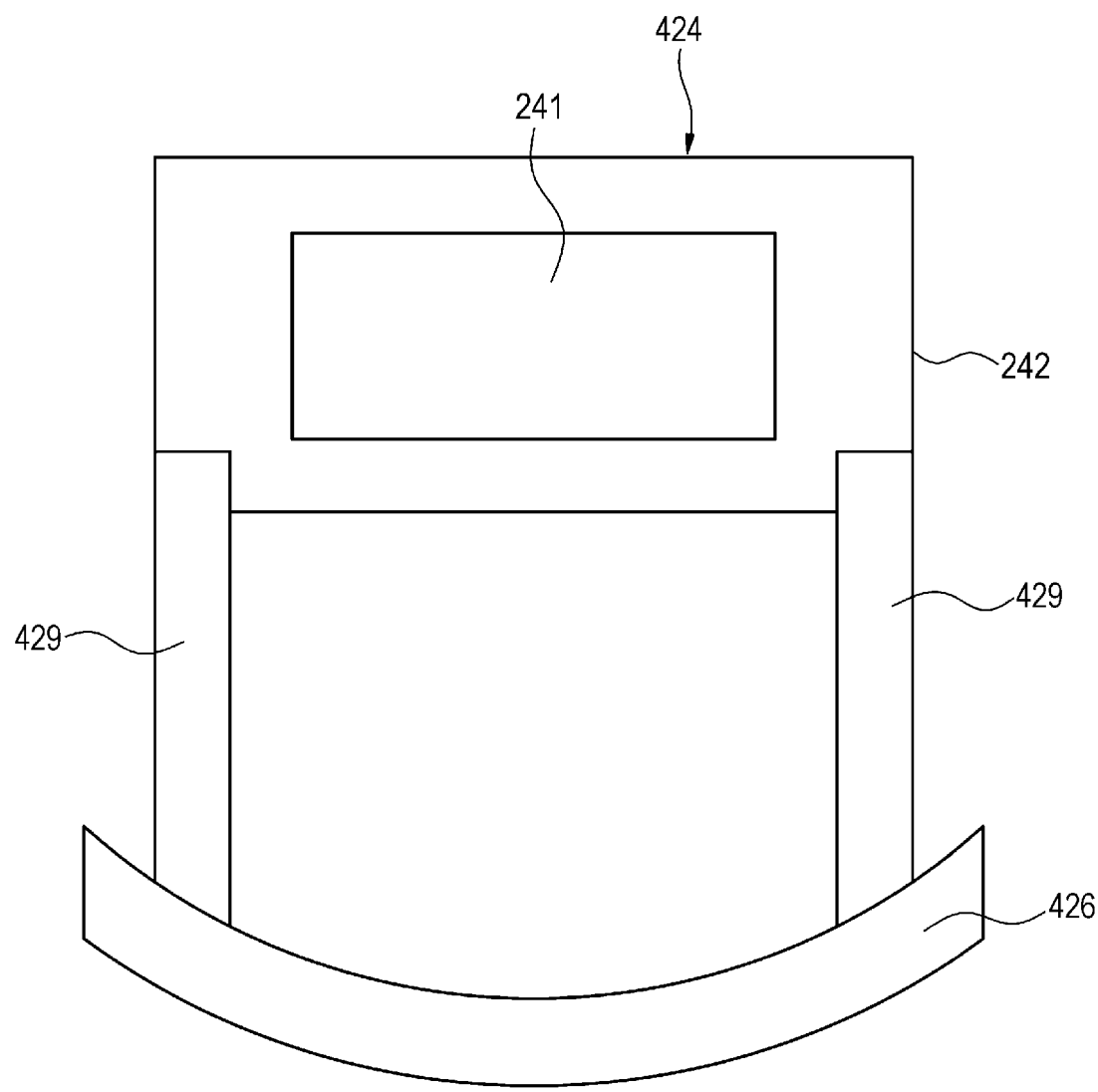

VEHICULAR DISPLAY SYSTEM AND IMAGE IRRADIATION DEVICE

TECHNICAL FIELD

The present disclosure relates to a vehicular display system and an image irradiation device.

BACKGROUND ART

Patent Literature 1 discloses a vehicular image correction device that corrects an image captured by a near-infrared camera such that an occupant can visually recognize obstacles in front of the vehicle. In addition, a night driving visibility assist device (night vision) that assists the driving visibility of the occupant during nighttime or under adverse conditions by displaying an image from a near-infrared camera on a head-up display device is disclosed.

Further, Patent Literature 2 discloses a head-up display that displays a virtual image to an occupant by reflecting visible light emitted from a display by a windshield using a concave mirror toward the occupant.

When external light such as sunlight enters the inside of the head-up display, the heat rays (infrared light) contained in the external light are focused on the display and cause a local temperature rise, resulting in disturbance of the image display and thermal damage of the display.

In Patent Literature 2, a cold mirror disposed between the display and the concave mirror prevents from focusing infrared light on the display.

CITATION LIST

Patent Literature

Patent Literature 1: JP2003-199094A
Patent Literature 2: JP2003-344801A

SUMMARY OF INVENTION

Technical Problem

Patent Literature 1 discloses that the image is corrected such that a density value of pixels becomes a density value lower than an obstacle density value when there are pixels having a density value higher than the obstacle density value of pixels corresponding to a pedestrian in an image captured by a near-infrared camera in order to display the pedestrian crossing the road more clearly than the headlights and streetlights of an oncoming vehicle.

However, Patent Literature 1 displays an image captured by the near-infrared camera even in the visible region. As a result, the visible light image and the near-infrared light image are displayed overlapping each other in the visible region, which may be troublesome for the occupant of the vehicle from the viewpoint of visibility.

An object of the present disclosure is to provide a vehicular display system with improved visibility in the visible region.

Further, an object of the present disclosure is to provide an image irradiation device capable of reducing the occurrence of heat damage due to external light.

Solution to Problem

According to a first aspect of the present disclosure, there is provided a vehicular display system provided in a vehicle, including: a first lamp configured to irradiate an outside of the vehicle with near-infrared light; a second lamp configured to irradiate the outside of the vehicle with visible light; a first camera configured to capture a first image of the outside of the vehicle irradiated by the first lamp; a second camera configured to capture a second image of the outside of the vehicle irradiated by the second lamp, the second camera including an imaging range of the first camera; a control unit configured to generate a third image in which a luminance of pixels of the first image corresponding to pixels of the second image is reduced, based on a luminance of the second image; and a head-up display configured to display the third image generated by the control unit.

According to the vehicular display system of the present disclosure, the first camera and the second camera capture the same imaging range. In the same imaging range, the control unit reduces the luminance of the pixels of the first image corresponding to the pixels of the second image based on the luminance of the second image by visible light. Even when the second image by the visible light contains high-luminance pixels, the luminance of the pixels of the first image corresponding to the pixels is reduced, and thus the luminance of the corresponding pixels of the generated third image is low and the pixels are displayed dark. That is, in the third image displayed by the head-up display, the pixels corresponding to the high-luminance pixels of the second image by the visible light are displayed dark. Therefore, in the visible region, it is possible to reduce troublesome of visibility due to overlapping of the first image by visible light and the second image by near-infrared light.

According to a second aspect of the present disclosure, there is provided an image irradiation device provided in a vehicle and configured to display a predetermined image, including: an image generation device configured to emit light for generating the predetermined image; a reflection unit configured to reflect the light emitted by the image generation device; and a connection unit connecting the image generation device and the reflection unit to each other, in which at least a part of the connection unit is formed of bimetal.

Bimetals have the property of deforming according to temperature changes. According to the above configuration, when the external light enters the inside of the image irradiation device and heat rays (far-infrared rays) contained in the external light are focused on the image generation device, the temperature in the vicinity of the image generation device rises, and at least a part of the connection unit deforms. As a result, the positional relationship between the reflection unit and the image generation device changes, and it is possible to reduce occurrence of deterioration of the image generation device caused by the heat rays focused on the image generation device. As a result, heat damage caused by external light can be reduced.

In this specification, the "temperature in the vicinity of the image generation device" is the ambient temperature of the image generation device, and includes the temperature of the region where the connection unit is disposed.

Advantageous Effects of Invention

According to the present disclosure, it is possible to provide a vehicular display system with improved visibility in the visible region.

Furthermore, according to the present disclosure, it is possible to provide an image irradiation device capable of reducing the occurrence of heat damage due to external light.

BRIEF DESCRIPTION OF DRAWINGS

FIG. 9 is a schematic view of a configuration of a part of the HUD as viewed from above.

DESCRIPTION OF EMBODIMENTS

An embodiment of the present disclosure (hereinafter, referred to as the present embodiment) will be described below with reference to the drawings. The dimensions of each member shown in this drawing may differ from the actual dimensions of each member for convenience of description.

In the description of the present embodiment, for convenience of description, the terms "left-right direction," "up-down direction," and "front-rear direction" may be referred to as appropriate. These directions are relative directions set for a head-up display (HUD) 42 shown in FIG. 2. Here, the "left-right direction" is a direction including "leftward direction" and "rightward direction." "Up-down direction" is a direction including "upward direction" and "downward direction." "Front-rear direction" is a direction including "forward direction" and "rearward direction." Although not shown in FIG. 2, the left-right direction is a direction orthogonal to the up-down direction and the front-rear direction.

First Embodiment

Figure 1:
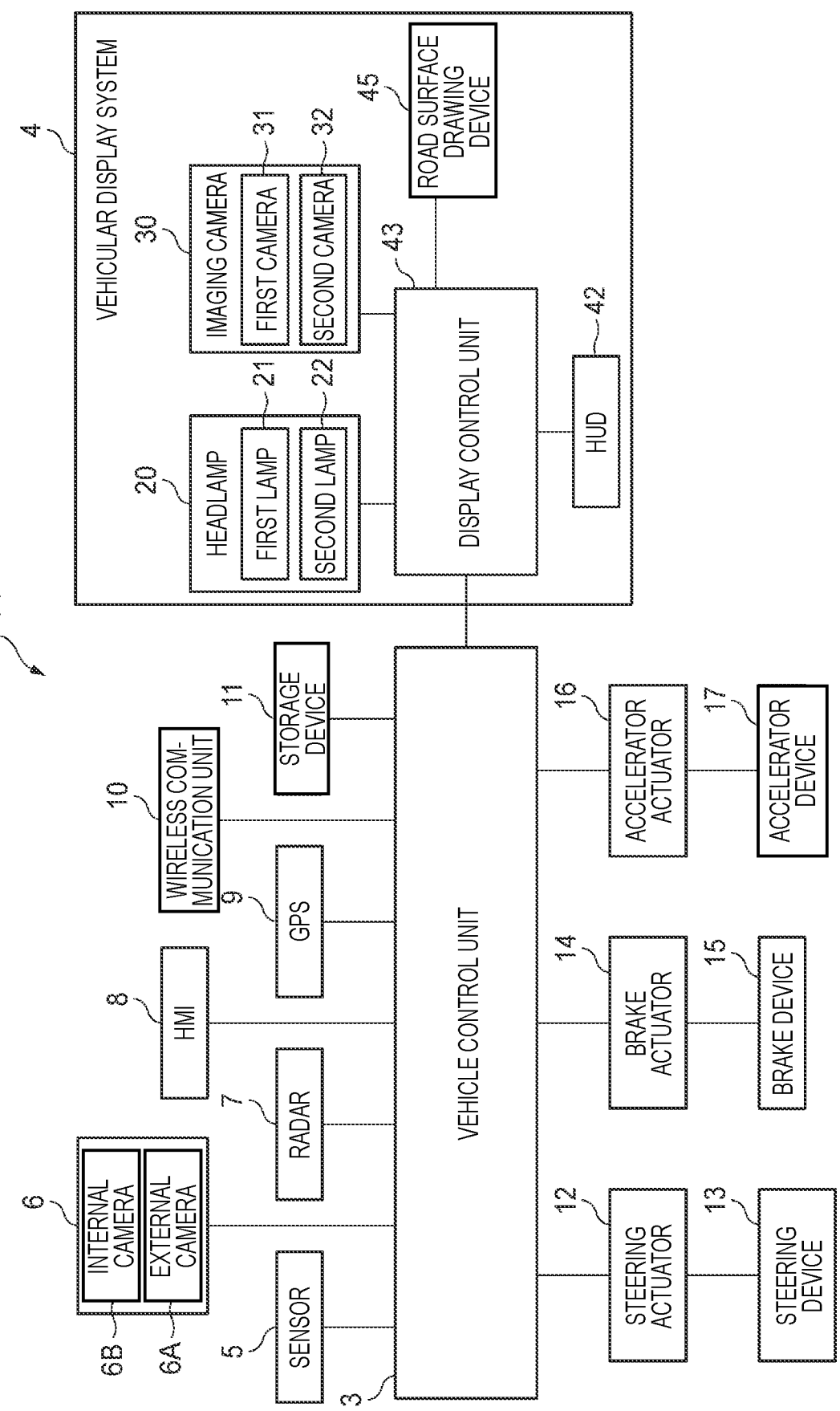
FIG. 1 is a block diagram of a vehicle system provided with a vehicular display system according to a first embodiment.

A vehicle system 2 according to the present embodiment will be described below with reference to FIG. 1. FIG. 1 is a block diagram of the vehicle system 2. A vehicle 1 equipped with the vehicle system 2 is a vehicle (automobile) capable of traveling in an automatic driving mode.

As shown in FIG. 1, the vehicle system 2 includes a vehicle control unit 3, a vehicular display system 4 (hereinafter simply referred to as "display system 4"), a sensor 5, a camera 6, and a radar 7. Further, the vehicle system 2 includes a human machine interface (HMI) 8, a global positioning system (GPS) 9, a wireless communication unit 10, a storage device 11, a steering actuator 12, a steering device 13, a brake actuator 14, a brake device 15, an accelerator actuator 16, and an accelerator device 17.

The vehicle control unit 3 is configured to control travel of the vehicle. The vehicle control unit 3 includes, for example, at least one electronic control unit (ECU). The electronic control unit includes a computer system (for example, system on a chip (SoC)) including one or more processors and one or more memories, and an electronic circuit including active elements and passive elements such as transistors. The processor includes, for example, at least one of a central processing unit (CPU), a micro processing unit (MPU), a graphics processing unit (GPU), and a tensor processing unit (TPU). The CPU may include a plurality of CPU cores. The GPU may include a plurality of GPU cores. The memory includes a read only memory (ROM) and a random access memory (RAM). A vehicle control program may be stored in the ROM. For example, the vehicle control program may include an artificial intelligence (AI) program for automatic driving. The AI program is a program (learned model) constructed by supervised or unsupervised machine learning (in particular, deep learning) using multilayer neural networks. The RAM may temporarily store a vehicle control program, vehicle control data, and/or surrounding environment information indicating the surrounding environment of the vehicle. The processor may be configured to load a program designated from various vehicle control programs stored in the ROM onto the RAM and execute various types of processing in cooperation with the RAM. Further, the computer system may be configured by a non-von Neumann computer such as an application specific integrated circuit (ASIC) or a field-programmable gate array (FPGA). Furthermore, the computer system may be configured by a combination of von Neumann computers and non-von Neumann computers.

The display system 4 includes a headlamp 20, an imaging camera 30, a road surface drawing device 45, an HUD 42, and a display control unit 43.

The headlamps 20 are disposed on the left and right sides of the front surface of the vehicle 1, and include a first lamp 21 that irradiates the outside of the vehicle 1 with near-infrared light, and a second lamp 22 that irradiates the outside of the vehicle 1 with visible light. Each of the first lamp 21 and the second lamp 22 has one or more light emitting elements such as light emitting diodes (LED) and laser diodes (LD), and optical members such as lenses and reflectors.

The first lamp 21 is configured to irradiate a range including at least above the horizontal with near-infrared light. For example, the first lamp 21 is a high beam lamp configured to irradiate the front part of the vehicle 1 with a high beam. The second lamp 22 is configured to irradiate a range including a part above the horizontal and a range including a part below the horizontal with visible light. For example, the second lamp 22 includes a high beam lamp configured to irradiate the front part of the vehicle 1 with a high beam, and a low beam lamp configured to irradiate the front part of the vehicle 1 with a low beam. The high beam lamp of the second lamp 22 has an adaptive driving beam (ADB) function in order to reduce glare to a pedestrian or an occupant of an oncoming vehicle. In addition, the first lamp 21 may irradiate a range including a part below the horizontal with the near-infrared light. The first lamp 21 and the second lamp 22 may be integrally provided in one housing, or may be provided in separate housings.

The imaging camera 30 includes a first camera 31 that captures a first image X1 of the outside of the vehicle 1 irradiated by the first lamp 21, and a second camera 32 that captures a second image X2 of the outside of the vehicle 1 irradiated by the second lamp 22. The imaging range of the first camera 31 and the imaging range of the second camera 32 include the same imaging region. In order to obtain substantially the same imaging angle and substantially the same imaging range, the first camera 31 and the second camera 32 are preferably provided integrally in the same housing. The first image X1 is a near-infrared light image formed by receiving reflected light of the light emitted from the first lamp 21 that emits near-infrared light, and near-infrared light emitted on the outside. The second image X2 is a visible light image formed by receiving reflected light of the light emitted from the second lamp 22 that emits visible light, and visible light emitted on the outside.

The road surface drawing device 45 is disposed in a lamp chamber of the headlamp 20. The road surface drawing device 45 is configured to emit a light pattern toward the road surface outside the vehicle 1. The road surface drawing device 45 includes, for example, a light source unit, a driving mirror, an optical system such as lenses and mirrors, a light source driving circuit, and a mirror driving circuit. The light source unit is a laser light source or an LED light source. For example, the laser light source is an RGB laser light source configured to emit red laser light, green laser light, and blue laser light, respectively. Examples of driving mirrors include micro electro mechanical systems (MEMS) mirrors, digital mirror devices (DMD), galvanomirrors, polygon mirrors, and the like. The light source driving circuit is configured to drive and control the light source unit. The light source driving circuit is configured to generate a control signal for controlling the operation of the light source unit based on a signal related to the predetermined light pattern transmitted from the display control unit 43, and then transmit the generated control signal to the light source unit. The mirror driving circuit is configured to drive and control the driving mirror. The mirror driving circuit is configured to generate a control signal for controlling the operation of the driving mirror based on a signal related to the predetermined light pattern transmitted from the display control unit 43, and then transmit the generated control signal to the driving mirror. When the light source unit is an RGB laser light source, the road surface drawing device 45 can draw light patterns of various colors on the road surface by scanning the laser light. For example, the light pattern may be an arrow-shaped light pattern that indicates the traveling direction of the vehicle.

The drawing method of the road surface drawing device 45 may be a raster scan method, a digital light processing (DLP) method, or a liquid crystal on silicon (LCOS) method. When the DLP method or the LCOS method is adopted, the light source unit may be an LED light source. In addition, a projection method may be adopted as the drawing method of the road surface drawing device. When a projection method is adopted, the light source unit may be a plurality of LED light sources disposed in a matrix. The road surface drawing devices 45 may be disposed in each of the lamp chambers of the left and right headlamps, or may be disposed on the roof of the vehicle body, in the bumper, or in the grille portion.

At least a part of the HUD 42 is positioned inside the vehicle 1. Specifically, the HUD 42 is provided at a predetermined location inside the vehicle 1. For example, the HUD 42 may be disposed in the dashboard of the vehicle 1. The HUD 42 is a visual interface between the vehicle 1 and the occupant. The HUD 42 is configured to display HUD information toward the occupant such that the predetermined information (hereinafter referred to as HUD information) is superimposed on the real space outside the vehicle 1 (in particular, the surrounding environment in front of the vehicle). Thus, the HUD 42 is an augmented reality (AR) display. The HUD information displayed by the HUD 42 is, for example, vehicle travel information related to traveling of the vehicle 1 and/or surrounding environment information related to the surrounding environment of the vehicle 1 (in particular, information related to a target that is present outside the vehicle 1). Details of the HUD 42 will be described later.

The display control unit 43 is configured to control the operations of the road surface drawing device 45, the headlamps 20 and the HUD 42. The display control unit 43 is configured by an electronic control unit (ECU). The electronic control unit includes a computer system (for example, SoC and the like) including one or more processors and one or more memories, and an electronic circuit including active elements and passive elements such as transistors. The processor includes at least one of CPU, MPU, GPU, and TPU. The memory includes ROM and RAM. In addition, the computer system may be configured by a non-von Neumann computer such as ASIC or FPGA. The display control unit 43 is an example of a control unit.

In the present embodiment, the vehicle control unit 3 and the display control unit 43 are provided as separate components, but the vehicle control unit 3 and the display control unit 43 may be configured integrally. In this respect, the display control unit 43 and the vehicle control unit 3 may be configured by a single electronic control unit. In addition, the display control unit 43 may include two electronic control units, an electronic control unit configured to control the operations of the headlamps 20 and the road surface drawing device 45, and an electronic control unit configured to control the operations of the HUD 42. Further, a control board 425 that controls the operation of the HUD 42 may be configured as a part of the display control unit 43.

The sensor 5 includes at least one of an acceleration sensor, a speed sensor, and a gyro sensor. The sensor 5 is configured to detect the traveling state of the vehicle 1 and output traveling state information to the vehicle control unit 3. The sensors 5 may further include a seating sensor that detects whether or not the driver is sitting in the driver's seat, a face orientation sensor that detects the direction of the face of the driver, an external weather sensor that detects external weather state, and a human sensor that detects whether or not there is a person inside the vehicle.

The camera 6 is, for example, a camera including an imaging device such as a charge-coupled device (CCD) or a complementary MOS (CMOS). The camera 6 includes one or more external cameras 6A and internal cameras 6B. The external camera 6A is configured to acquire image data representing the surrounding environment of the vehicle and then transmit the image data to the vehicle control unit 3. The vehicle control unit 3 acquires surrounding environment information based on the transmitted image data. Here, the surrounding environment information may include information related to targets (pedestrians, other vehicles, signs, and the like) which are present outside the vehicle 1. For example, the surrounding environment information may include information related to the attributes of the target which are present outside the vehicle 1, and information related to the distance and position of the target relative to the vehicle 1. The external camera 6A may be configured as a monocular camera, or may be configured as a stereo camera. Further, the imaging camera 30 may be substituted for the external camera 6A.

The internal camera 6B is configured to be disposed inside the vehicle 1 and acquire image data indicating the occupant. The internal camera 6B functions as a tracking camera that tracks a viewpoint E of the occupant. Here, the viewpoint E of the occupant may be either the viewpoint of the left eye of the occupant or the right eye of the occupant. Alternatively, the viewpoint E may be defined as the midpoint of a line connecting the viewpoint of the left eye and the viewpoint of the right eye. The display control unit 43 may specify the position of the viewpoint E of the occupant based on the image data acquired by the internal camera 6B. The position of the viewpoint E of the occupant may be updated at predetermined intervals based on the image data, or may be determined only once when the vehicle is started.

The radar 7 includes at least one of millimeter wave radar, microwave radar, and laser radar (for example, LiDAR unit). For example, the LiDAR unit is configured to detect the surrounding environment of the vehicle 1. In particular, the LiDAR unit is configured to acquire 3D mapping data (point cloud data) representing the surrounding environment of the vehicle 1 and then transmit the 3D mapping data to the vehicle control unit 3. The vehicle control unit 3 specifies surrounding environment information based on the transmitted 3D mapping data.

The HMI 8 includes an input unit that receives an input operation from the driver, and an output unit that outputs travel information and the like to the driver. The input unit includes a steering wheel, an accelerator pedal, a brake pedal, an driving mode switch for switching the driving mode of the vehicle, and the like. The output unit is a display (excluding the HUD) that displays various types of travel information. The GPS 9 is configured to acquire current location information of the vehicle 1 and output the acquired current location information to the vehicle control unit 3.

The wireless communication unit 10 is configured to receive information related to another vehicle around the vehicle 1 (for example, travel information or the like) from another vehicle, and transmit information related to the vehicle 1 (for example, travel information or the like) to another vehicle (vehicle-to-vehicle communication). Further, the wireless communication unit 10 is configured to receive infrastructure information from infrastructure equipment such as traffic lights and marker lamps, and to transmit travel information of the vehicle 1 to the infrastructure equipment (road-to-vehicle communication). In addition, the wireless communication unit 10 is configured to receive information related to the pedestrian from a portable electronic device (smartphone, tablet, wearable device, and the like) carried by the pedestrian, and transmit the own vehicle travel information of the vehicle 1 to the portable electronic device (pedestrian-to-vehicle communication). The vehicle 1 may directly communicate with another vehicle, infrastructure equipment, or portable electronic devices in an ad-hoc mode, or may communicate through an access point. Furthermore, the vehicle 1 may communicate with another vehicle, infrastructure equipment, or portable electronic devices through a communication network (not shown). The communication network includes at least one of the Internet, a local area network (LAN), a wide area network (WAN), and a radio access network (RAN). Wireless communication standards are, for example, Wi-Fi (registered trademark), Bluetooth (registered trademark), ZigBee (registered trademark), LPWA, DSRC (registered trademark), or Li-Fi. In addition, the vehicle 1 may communicate with other vehicles, infrastructure equipment, or portable electronic devices using the fifth generation mobile communication system (5G).

The storage device 11 is an external storage device such as a hard disk drive (HDD) or a solid state drive (SSD). The storage device 11 may store two-dimensional or three-dimensional map information and/or vehicle control programs. For example, the three-dimensional map information may include 3D mapping data (point cloud data). The storage device 11 is configured to output map information and a vehicle control program to the vehicle control unit 3 in response to a request from the vehicle control unit 3. The map information and the vehicle control program may be updated through the wireless communication unit 10 and the communication network.

When the vehicle travels in the automatic driving mode, the vehicle control unit 3 automatically generates at least one of a steering control signal, an accelerator control signal, and a brake control signal based on the traveling state information, the surrounding environment information, the current location information, the map information, and the like. The steering actuator 12 is configured to receive a steering control signal from the vehicle control unit 3 and control the steering device 13 based on the received steering control signal. The brake actuator 14 is configured to receive a brake control signal from the vehicle control unit 3 and control the brake device 15 based on the received brake control signal. The accelerator actuator 16 is configured to receive an accelerator control signal from the vehicle control unit 3 and control the accelerator device 17 based on the received accelerator control signal. Thus, the vehicle control unit 3 automatically controls the traveling of the vehicle 1 based on the traveling state information, the surrounding environment information, the current location information, the map information, and the like. That is, in the automatic driving mode, the traveling of the vehicle 1 is automatically controlled by the vehicle system 2.

On the other hand, when the vehicle 1 travels in the manual driving mode, the vehicle control unit 3 generates a steering control signal, an accelerator control signal, and a brake control signal in accordance with the manual operation of the driver on the accelerator pedal, the brake pedal, and the steering wheel. Thus, in the manual driving mode, the steering control signal, the accelerator control signal, and the brake control signal are generated by the manual operation of the driver, and thus the traveling of the vehicle 1 is controlled by the driver.

Next, driving modes of the vehicle will be described. The driving mode consists of an automatic driving mode and a manual driving mode. The automatic driving mode consists of a fully automatic driving mode, an advanced driving assistance mode, and a driving assistance mode. In the fully automatic driving mode, the vehicle system 2 automatically performs all types of traveling control including steering control, brake control, and accelerator control, and the driver is not in a state where the driver can drive the vehicle 1. In the advanced driving assistance mode, the vehicle system 2 automatically performs all types of traveling control including steering control, brake control, and accelerator control, and the driver is in a state where the driver can drive the vehicle 1, but does not drive the vehicle 1. In the driving assistance mode, the vehicle system 2 automatically performs some of traveling control out of steering control, brake control, and accelerator control, and the driver drives the vehicle 1 under the driving assistance of the vehicle system 2. On the other hand, in the manual driving mode, the vehicle system 2 does not automatically perform travel control, and the driver drives the vehicle 1 without the driving assistance of the vehicle system 2.

Figure 2:
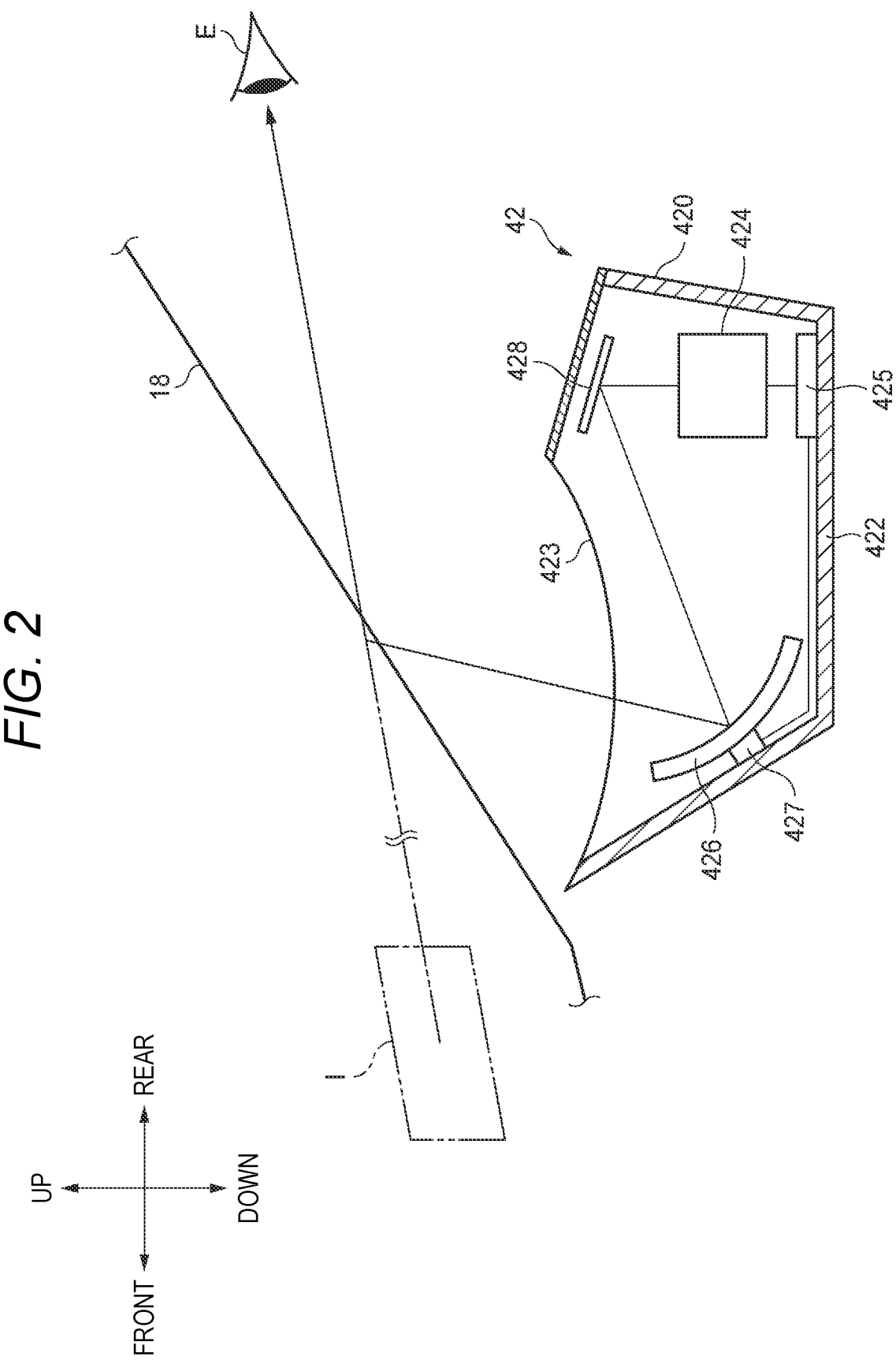
FIG. 2 is a schematic diagram of a head-up display (HUD) according to the present embodiment provided in the vehicular display system.

Next, the details of the HUD 42 will be described. FIG. 2 is a schematic diagram of the HUD 42 according to the present embodiment. As shown in FIG. 2, the HUD 42 has an HUD main body unit 420. The HUD main body unit 420 has a housing 422 and an exit window 423. The exit window 423 is a transparent plate that allows visible light to pass through. The HUD main body unit 420 has an image generation unit (picture generation unit (PGU)) 424, the control board 425, a concave mirror 426, a driving mechanism 427, and a plane mirror 428 inside the housing 422.

The image generation unit 424 is configured to emit light for generating a predetermined image. The image generation unit 424 is fixed to housing 422. The light emitted from the image generation unit 424 is, for example, visible light. Although not shown in detail, the image generation unit 424 has a light source, optical components, and a display device. The light source is, for example, a laser light source or an LED light source. The LED light source is, for example, a white LED light source. The laser light source is an RGB laser light source configured to emit red laser light, green laser light, and blue laser light, respectively. Optical components include prisms, lenses, diffusers, magnifiers, and the like. The optical component transmits light emitted from the light source and emits the light toward the display device. The display device is a liquid crystal display, a digital mirror device (DMD), or the like. The drawing method of the image generation unit 424 may be a raster scan method, a digital light processing (DLP) method, or a liquid crystal on silicon (LCOS) method. When the DLP method or the LCOS method is adopted, the light source of the HUD 42 may be an LED light source. In addition, when a liquid crystal display system is adopted, the light source of the HUD 42 may be a white LED light source. The image generation unit 424 is an example of an image generation device.

The control board 425 is configured to control the operation of each unit including the image generation unit 424 and the driving mechanism 427. The control board 425 is equipped with a processor such as a central processing unit (CPU) and memory, and the processor executes a computer program read from the memory to control the operation of the image generation unit 424. The control board 425 is configured to generate a control signal for controlling the operation of the image generation unit 424 based on the image data transmitted from the display control unit 43, and then transmit the generated control signal to the image generation unit 424. The control board 425 may be connected to the vehicle control unit 3 of the vehicle 1, for example, may generate a control signal based on the vehicle travel information and the surrounding environment information transmitted from the vehicle control unit 3, and output the generated control signal to the image generation unit 424. In addition, the control board 425 may control to change the orientation of the concave mirror 426 through the driving mechanism 427.

The concave mirror 426 is disposed on the optical path of the light emitted from the image generation unit 424 and reflected by the plane mirror 428. Specifically, the concave mirror 426 is disposed in front of the image generation unit 424 and the plane mirror 428 in the HUD main body unit 420. The concave mirror 426 is configured to reflect the light emitted by the image generation unit 424 toward a windshield 18 (for example, the front window of the vehicle 1) through the exit window 423. The concave mirror 426 has a concavely curved reflecting surface that forms a virtual image, and reflects the image of the light emitted from the image generation unit 424 and formed into an image at a predetermined magnification.

The windshield 18 is irradiated with the light emitted through the exit window 423 of the HUD main body unit 420. A part of the light emitted from the HUD main body unit 420 to the windshield 18 is reflected toward the viewpoint E of the occupant. As a result, the occupant recognizes the light emitted from the HUD main body unit 420 as a virtual image (predetermined image) formed at a predetermined distance in front of the windshield 18. As a result of the image displayed by the HUD 42 being superimposed on the real space in front of the vehicle 1 through the windshield 18 in this manner, the occupant can visually recognize that a virtual image object I formed by the predetermined image is floating on the road positioned outside the vehicle.

When forming a 2D image (planar image) as the virtual image object I, a predetermined image is projected to be a virtual image at a single distance determined in any manner. When forming a 3D image (stereoscopic image) as the virtual image object I, a plurality of predetermined images that are the same or different from each other are projected to be virtual images at different distances. In addition, the distance of the virtual image object I (the distance from the viewpoint E of the occupant to the virtual image) can be adjusted by adjusting the distance from the image generation unit 424 to the viewpoint E of the occupant (for example, by adjusting the distance between the image generation unit 424 and the concave mirror 426). Further, the HUD main body unit 420 may not have the plane mirror 428. In this case, the light emitted from the image generation unit 424 is incident on the concave mirror 426 without being reflected by the plane mirror 428.

Figure 3:
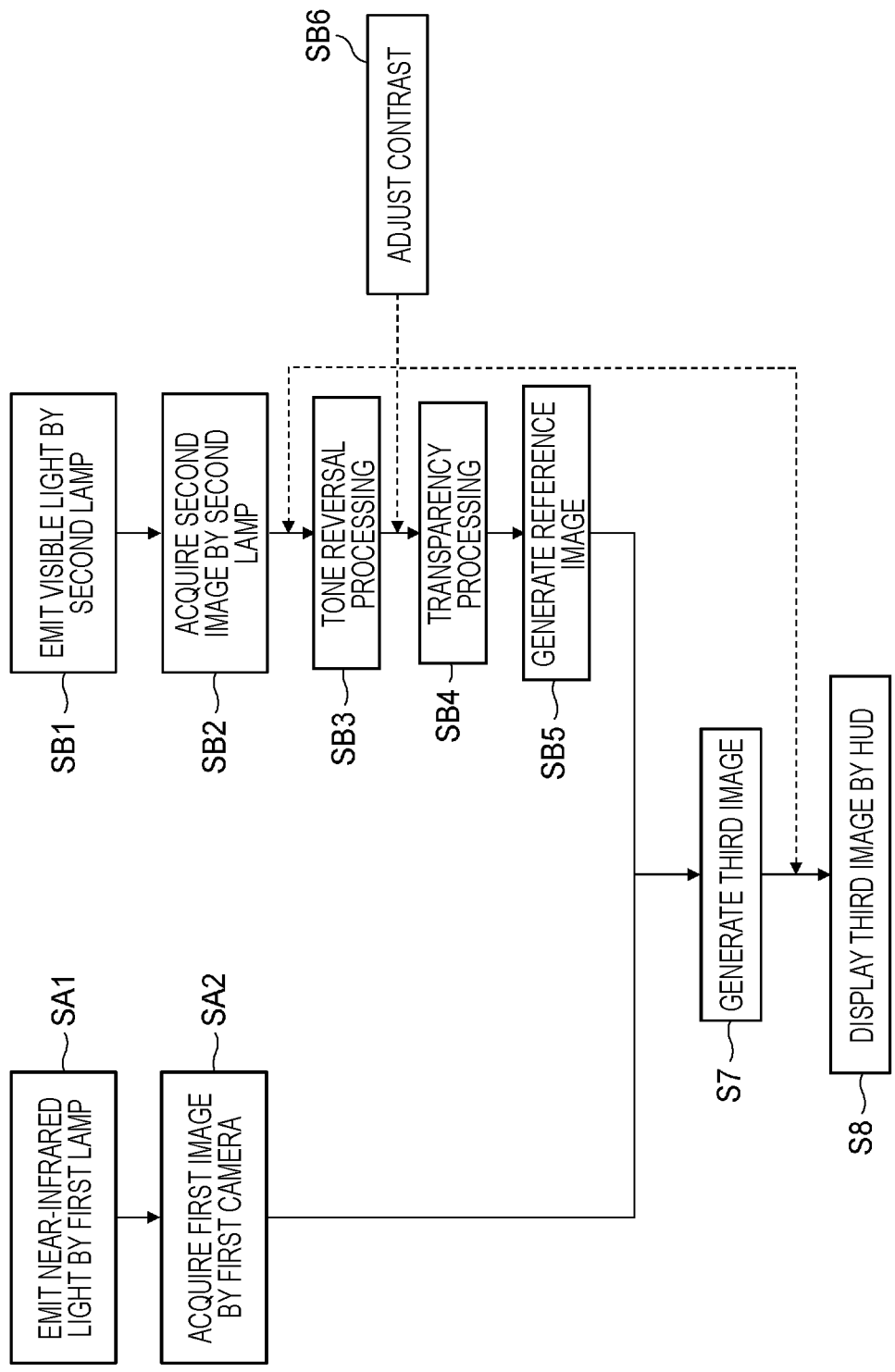
FIG. 3 is a flow chart showing a flow of processing of the vehicular display system.

Next, the flow of processing of the display system 4 according to the present embodiment will be described. FIG. 3 is a flow chart showing the flow of processing of the display system 4.

As shown in FIG. 3, first, the first lamp 21 irradiates the outside of the vehicle 1 with near-infrared light (step SA1). After that, the first camera 31 captures the appearance of the outside of the vehicle 1 illuminated with the near-infrared light to acquire a first image X1 (step SA2). In the first image X1, which is a near-infrared light image, the pixels corresponding to the target illuminated bright with the near-infrared light are high-luminance pixels, and the pixels corresponding to the target relatively darkly illuminated with the near-infrared light are low-luminance pixels. The luminance may have values from 0 to 255. The first camera 31 transmits the acquired first image X1 to the display control unit 43.

Similarly, the second lamp 22 irradiates the outside of the vehicle 1 with visible light to (step SB1). After that, the second camera 32 captures the appearance of the outside of the vehicle 1 illuminated with the visible light to acquire a second image X2 (step SB2). In the second image X2, which is a visible light image, the pixels corresponding to the target illuminated bright with visible light are high-luminance pixels, and the pixels corresponding to the target relatively darkly illuminated with visible light are low-luminance pixels. The luminance may have values from 0 to 255. The second camera 32 transmits the acquired second image X2 to the display control unit 43.

Since the imaging range of the first camera 31 and the imaging range of the second camera 32 include the same imaging range, pixels P1A of the first image X1 captured by the first camera 31 and pixels P2A of the second image X2 captured by the second camera 32 correspond to each other and indicate one target at the same position. Similarly, pixels P1B of the first image X1 and pixels P2B of the second image X2 correspond to each other and indicate another target at the same position.

In addition, while the first lamp 21 irradiates the range including a part above the horizontal, which is the front of the vehicle 1, with near-infrared light, the second lamp 22 irradiates the range including a part above the horizontal and the range including a part below the horizontal, which is the front of the vehicle 1, with visible light. The second lamp 22 has an ADB function in order to reduce glare to a pedestrian or an occupant of an oncoming vehicle when visible light is emitted. That is, the second lamp 22 does not irradiate a pedestrian or an oncoming vehicle main body with visible light, but the first lamp 21 irradiates a pedestrian or an oncoming vehicle with near-infrared light. The pixels P1A of the first image X1 are pixels with luminance reflecting near-infrared light, and the pixels P2A of the second image X2 are pixels with luminance reflecting visible light. Similarly, the pixels P1B of the first image X1 are pixels with luminance reflecting near-infrared light, and the pixels P2B of the second image X2 are pixels with luminance reflecting visible light. Each luminance is not related to each other and is an independent value.

The display control unit 43 performs tone reversal processing on the transmitted second image X2 (step SB3). Specifically, the display control unit 43 relatively reverses the luminance of the high-luminance pixels in the second image X2 and the luminance of the low-luminance pixels in the second image X2. By the tone reversal processing, the luminance of pixels detected as bright pixels is converted from a high value to a low value, and the luminance of pixels detected as dark pixels is converted from a low value to a high value. For example, when the luminance of the pixels P2A (an example of a high-luminance pixel) displayed brightest in the second image X2 is 255, the luminance of the pixels P2A is converted to 0 by the tone reversal processing. For example, when the luminance of the pixels P2B (an example of a low-luminance pixel) displayed relatively dark in the second image X2 is 30, the luminance of the pixels P2B is converted to 225 by the tone reversal processing.

The display control unit 43 further performs transparency processing on the second image X2 that has undergone the tone reversal processing (step SB4). Specifically, the display control unit 43 sets high transparency for the pixels P2B with high luminance, and sets low transparency for the pixels P2A with low luminance. For example, when the luminance of the pixels P2B is converted to 225 by the tone reversal processing, the transparency is set to 225 for the pixels P2B. For example, when the luminance of the pixels P2A is converted to 0 by the tone reversal processing, the transparency is set to 0 for the pixels P2A.

The display control unit 43 generates the reference image Y by performing transparency processing on the second image X2 (step SB5). The pixels P2A displayed brightest in the second image X2, which is a visible light image, correspond to pixels P2A' in the reference image Y. The transparency of pixels P2A' is 0. The pixels P2B displayed relatively dark in the second image X2, which is a visible light image, correspond to pixels P2B' in the reference image Y. The transparency of pixels P2B' is 225.

After generating the reference image Y, the display control unit 43 superimposes the generated reference image Y and the first image X1 transmitted from the first camera 31 to generate a third image X3 (step S7). For example, when the luminance of the pixels P1A of the first image X1 corresponding to the pixels P2A' of the reference image Y is 100, the pixels P2A' having a transparency of 0 are superimposed on the pixels P1A having a luminance of 100. At this time, the pixels P2A' having a transparency of 0 does not allow light at all even no matter what the luminance of the superimposed pixels P1A is, and thus the luminance of the pixels P1A is 0. For example, when the luminance of the pixels P1B of the first image X1 corresponding to the pixels P2B' of the reference image Y is 100, the pixels P2B' having a transparency of 225 are superimposed on the pixels P1B having a luminance of 100. At this time, the pixels P2B' having a transparency of 225 allows much of the luminance of the superimposed pixels P1B, and thus the luminance of the pixels P1B is 88, for example.

In this manner, the display control unit 43 generates the third image X3 by lowering the luminance of the pixels of the first image X1 corresponding to the pixels of the second image X2 based on the luminance of the second image X2. More specifically, since the pixels displayed brightest in the second image X2, which is a visible light image, are set to have a low transparency, the corresponding pixels of the third image X3 are displayed dark. Conversely, since the pixels displayed relatively dark in the second image X2, which is a visible light image, are set to have a low transparency, the corresponding pixels of the third image X3 are displayed relatively bright.

The third image X3 generated by the display control unit 43 is displayed by the HUD 42 toward the occupant of the vehicle 1 (step S8). Specifically, the HUD 42 is configured to display the third image X3 to the occupant such that the third image X3 is superimposed on the visible space outside the vehicle 1. Thus, the occupant of the vehicle 1 can visually recognize the third image X3 in which the luminance of the pixels of the first image X1, which is a near-infrared light image, is lowered based on the luminance of the second image X2, which is a visible light image.

In addition, when the third image X3 is generated (step S7), the imaging timings of the first camera 31 and the second camera 32 preferably differ by a predetermined small amount of time such that both the superimposed reference image Y and the first image X1 show the same target. Specifically, the imaging timing of the first camera 31 is preferably later than the imaging timing of the second camera 32 by the short time required for the display control unit 43 to generate the reference image Y based on the second image X2.

In addition, the display control unit 43 may adjust the contrast of the second image X2 before setting the transparency of the pixels of the second image X2 (step SB6). The display control unit 43 may perform such contrast adjustment before the tone reversal processing (step SB3) or before the transparency processing (step SB4). For example, when the luminance distribution in the image is biased toward high luminance or low luminance, the display control unit 43 may adjust the contrast such that the difference between the luminance of the pixels P2A and the luminance of the pixels P2B is large (such that the difference in contrast of the second image X2 is large). Otherwise, the display control unit 43 may adjust the contrast such that the difference between the luminance of the pixels P2A and the luminance of the pixels P2B becomes small (such that the difference in contrast of the second image X2 changes gradually).

The display control unit 43 may adjust the contrast of the third image X3 (step SB6) before displaying the third image X3 on the HUD 42 (step S8). For example, the display control unit 43 may adjust the contrast such that the difference in contrast of the third image X3 changes significantly. Otherwise, the display control unit 43 may adjust the contrast such that the difference in contrast of the third image X3 changes gradually.

Next, each image generated by the display system 4 according to the present embodiment will be described with reference to FIGS. 4 to 7. FIGS. 4 to 7 show schematic diagrams of various images handled by the display control unit 43 when the vehicle 1 is traveling at night in a state where the headlamps 20 are turned on. As a common point in FIGS. 4 to 7, on the road on which the vehicle 1 is traveling, an oncoming vehicle 60 is traveling. The oncoming vehicle 60 is traveling with a headlamp 62 attached to an oncoming vehicle main body 61 turned on. A region displayed bright by irradiation of the low beam lamps of the headlamps 20 of the vehicle 1 is defined as a region 53 here. A region displayed bright by irradiation of the low beam lamps of the headlamps 62 is defined as a region 63 here. Moreover, a pedestrian 70 is in front of the vehicle 1 and farther than the region 53. H-H indicates a horizontal line. The first lamp 21 of the present embodiment is configured to irradiate the entire front part of the vehicle 1, including a part above the horizontal line H-H (far part).

Figure 4:
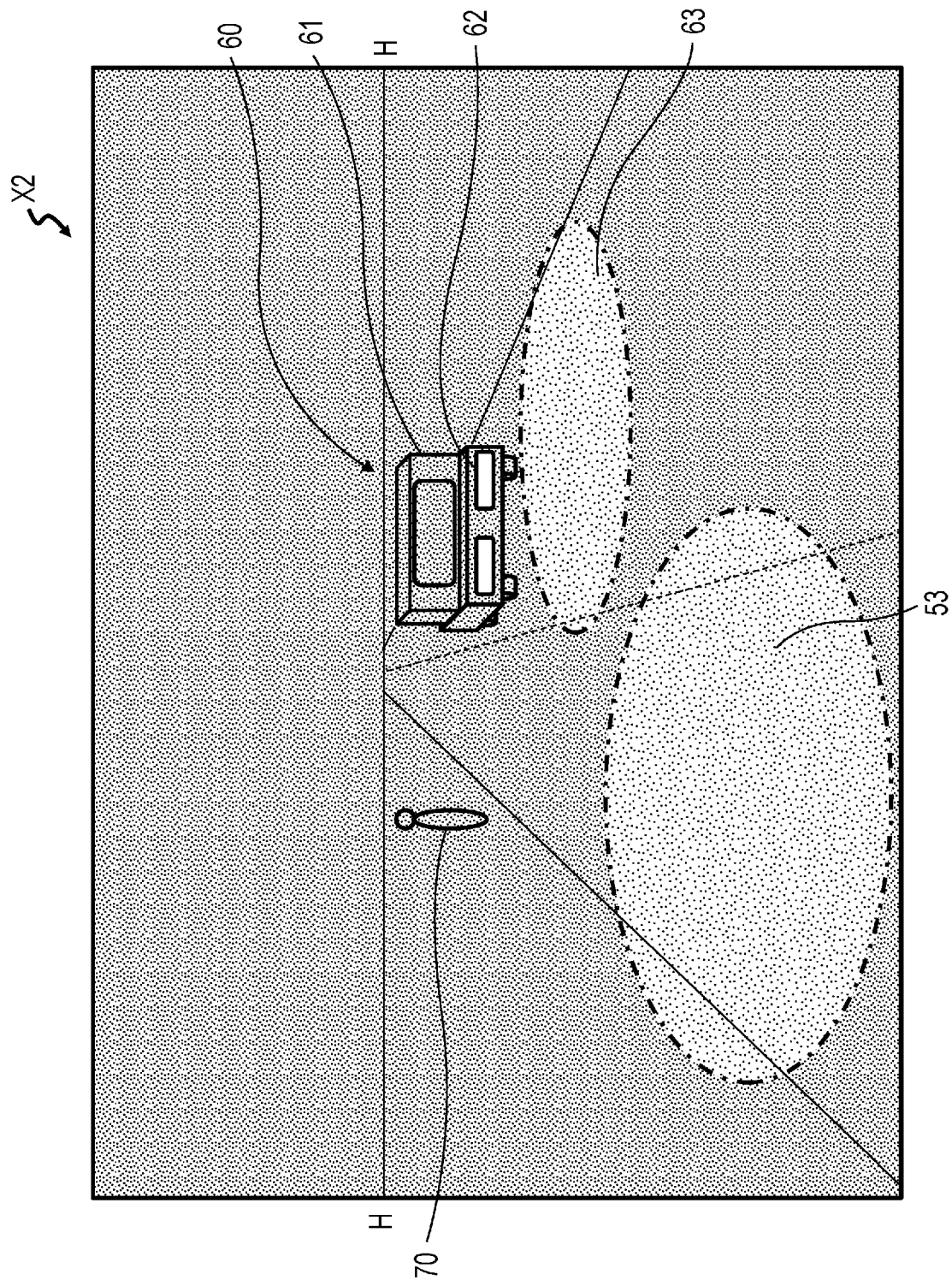
FIG. 4 is a schematic diagram of a second image captured by a second camera provided in the vehicular display system.

FIG. 4 is a schematic diagram of the second image X2 captured by the second camera 32 (step SB2 in FIG. 3). As shown in FIG. 4, in the second image X2, which is a visible light image, the headlamps 62 of the oncoming vehicle 60 are displayed brightest. The luminance of pixels P262 of the second image X2, which corresponds to the headlamps 62, is 255, for example. In addition, the region 53 illuminated by the headlamps 20 of the vehicle 1 and the region 63 illuminated by the headlamps 62 of the oncoming vehicle 60 are displayed relatively bright. The luminance of pixels P253 corresponding to the region 53 and the luminance of pixels P263 corresponding to the region 63 are, for example, 200 each. The oncoming vehicle main body 61 and the pedestrian 70 of the oncoming vehicle 60 are displayed dark, and the occupant of the vehicle 1 can hardly visually recognize the oncoming vehicle main body 61 and the pedestrian 70. The luminance of pixels P$_2$61 corresponding to the oncoming vehicle main body 61 and the luminance of pixels P$_2$70 corresponding to the pedestrian 70 are, for example, 30, respectively. The second image X2 is transmitted to the display control unit 43.

The display control unit 43 performs tone reversal processing on the transmitted second image X2 (step SB3 of FIG. 3). For example, the luminance of pixels P$_2$62, which corresponds to headlamp 62, is converted from 255 to 0. The luminance of pixels P$_2$53 corresponding to region 53 and the luminance of pixels P263 corresponding to region 63 are converted from 200 to 55. The luminance of the pixels P$_2$61 corresponding to the oncoming vehicle main body 61 and the luminance of the pixels P$_2$70 corresponding to the pedestrian 70 are converted from 30 to 225. In this manner, the display control unit 43 relatively reverses the luminance of the high-luminance pixels in the second image X2 and the luminance of the low-luminance pixels in the second image X2.

Figure 5:
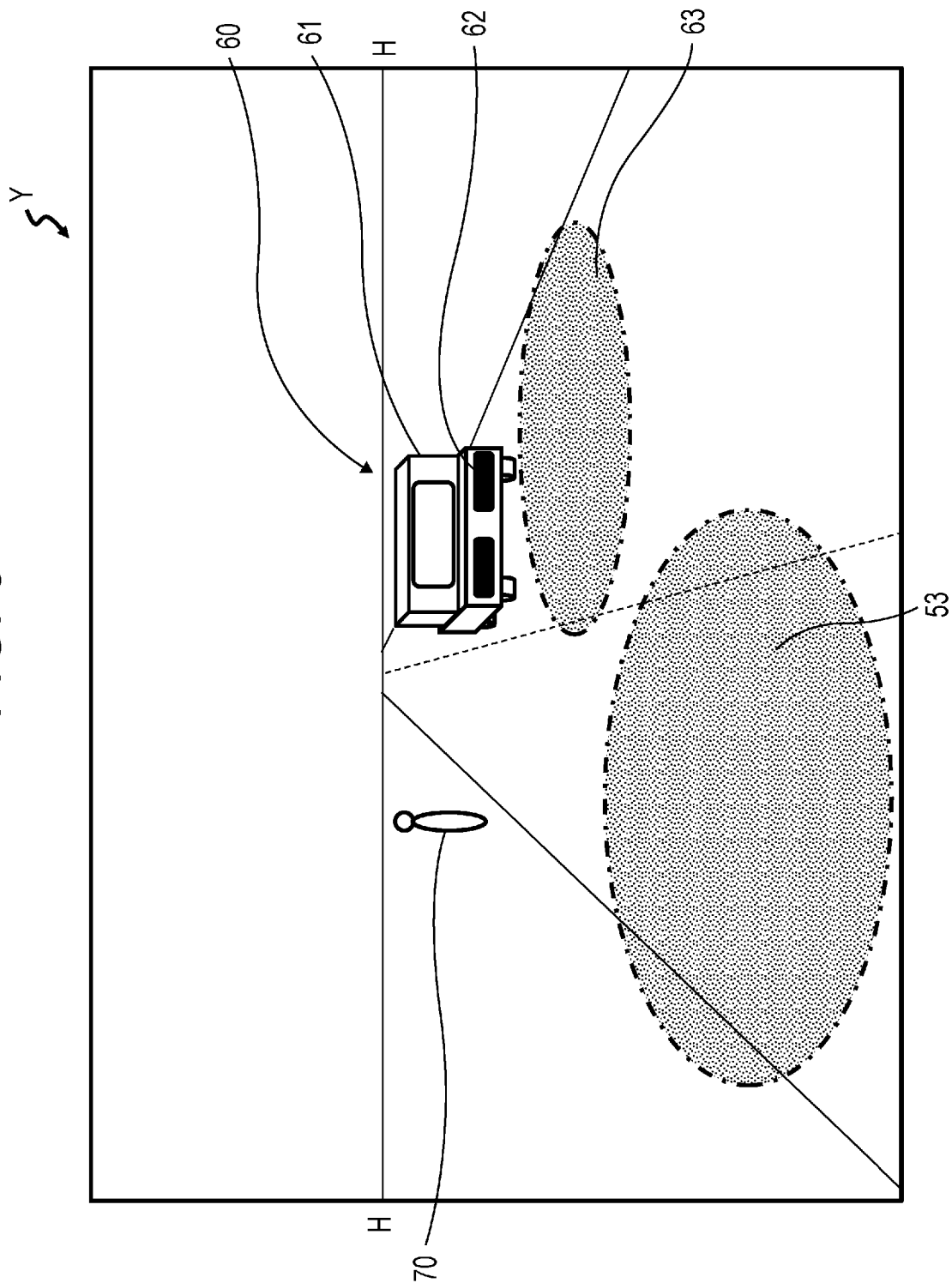
FIG. 5 is a schematic diagram of a reference image generated by the vehicular display system.

After the tone reversal processing, the display control unit 43 performs transparency processing on the second image X2 subjected to the tone reversal processing (step SB4 in FIG. 3). Accordingly, a transparency of 0 is set for the pixels P$_2$62 corresponding to the headlamp 62. The pixels P$_2$53 corresponding to the region 53 and the pixels P263 corresponding to the region 63 are set to transparency 55. The pixels P$_2$61 corresponding to the oncoming vehicle main body 61 and the pixels P$_2$70 corresponding to the pedestrian 70 are set to transparency of 225. In this manner, the display control unit 43 generates the reference image Y (step SB5 in FIG. 3). FIG. 5 is a schematic diagram of the reference image Y generated by the display control unit 43. The pixels set with high transparency in the reference image Y correspond to the pixels at a part displayed bright on the image to be finally displayed (third image X3), and the pixels set with low transparency in the reference image Y correspond to the pixels at a non-displayed part or a part displayed dark on the image to be finally displayed (third image X3). As shown in FIG. 5, in the reference image Y, a low transparency of 0 is set to pixels P$_2$62' corresponding to the headlamp 62 displayed brightest in the second image X2. On the other hand, relatively high transparency of 225 is set for the pixels P$_2$61' corresponding to the oncoming vehicle main body 61 and the pixels P$_2$70 corresponding to a pedestrian 70' which were displayed dark in the second image X2. Relatively low transparency of 55 is set for pixels P$_2$53' corresponding to the region 53 and pixels P$_2$63' corresponding to the region 63, which are displayed relatively bright in the second image X2. Thus, in the present embodiment, by creating the reference image Y, the pixels to be displayed as the third image X3 to be displayed to the occupant of the vehicle 1 are extracted from the second image X2, which is a visible light image.

Figure 6:
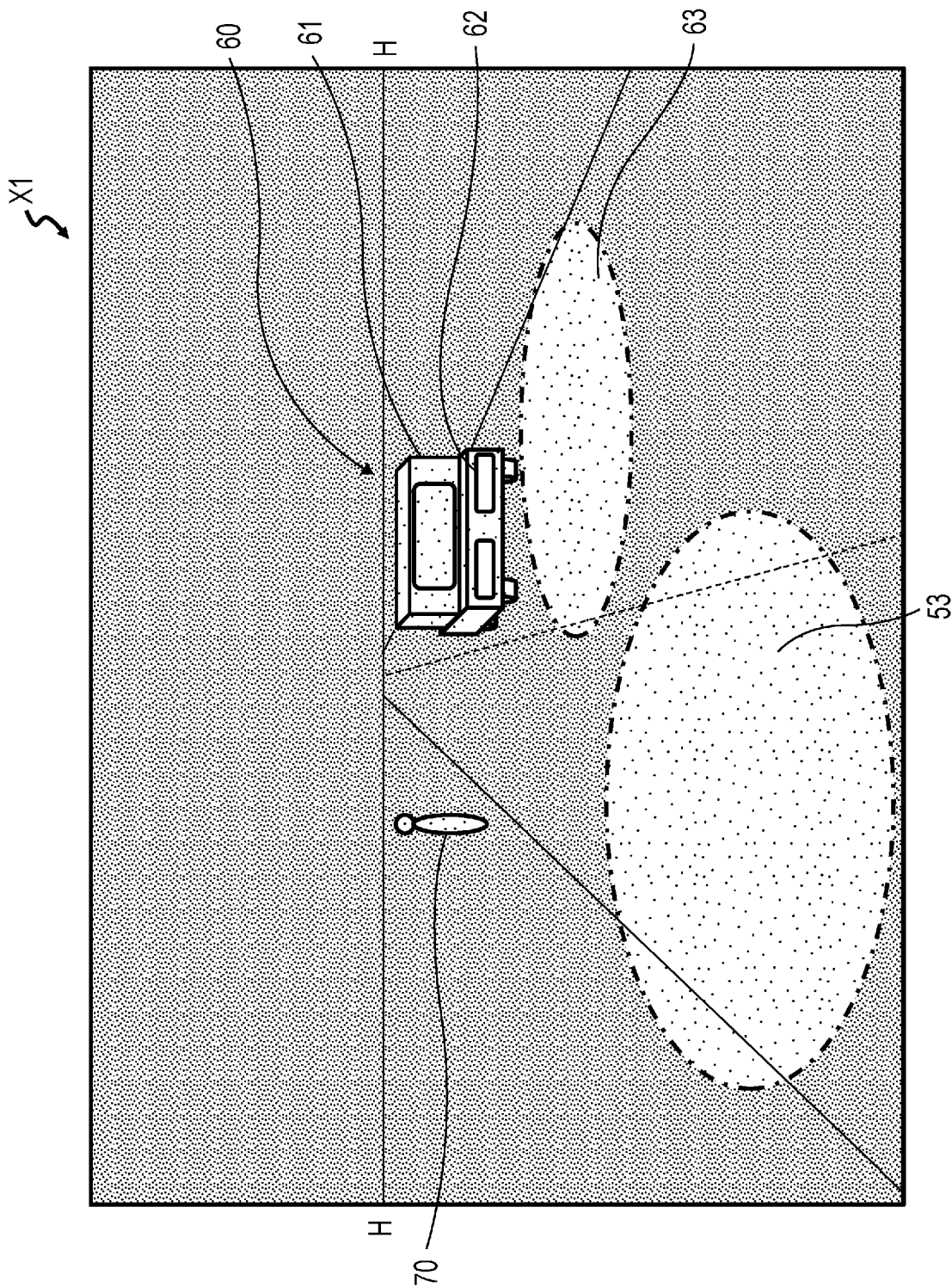
FIG. 6 is a schematic diagram of a first image captured by a first camera provided in the vehicular display system.

FIG. 6 is a schematic diagram of the first image X1 captured by the first camera 31 (step SA1 in FIG. 3). As shown in FIG. 5, in the first image X1, which is a near-infrared light image, the headlamps 62 of the oncoming vehicle 60 are displayed brightest. The luminance of pixels P$_1$62 of the first image X1, which corresponds to the headlamp 62, is 255, for example. The region 53 illuminated by the headlamps 20 of the vehicle 1 and the region 63 illuminated by the headlamps 62 of the oncoming vehicle 60 are displayed relatively bright. The luminance of pixels P$_1$53 corresponding to the region 53 and the luminance of pixels P$_1$63 corresponding to the region 63 are, for example, 200 each. The oncoming vehicle main body 61 of the oncoming vehicle 60 and the pedestrian 70 are also displayed relatively bright. The luminance of pixels P$_1$61 corresponding to the oncoming vehicle main body 61 and the luminance of pixels P$_1$70 corresponding to the pedestrian 70 are, for example, 200, respectively. The first image X1 is transmitted to the display control unit 43.

The display control unit 43 generates the third image X3 by superimposing the transmitted first image X1 (FIG. 6) and the generated reference image Y (FIG. 5) (step S7 in FIG. 3). The image processing is so-called mask processing, and the third image X3 is a masked image. For example, the pixels P$_2$62' of the reference image Y is superimposed on the pixels P$_1$62 of the first image X 1 corresponding to the headlamp 62. Since the transparency of pixels P$_2$62' is 0, the luminance of pixels P$_1$62 is 0 when superimposed. The pixels P$_2$53' of the reference image Y is superimposed on the pixels P$_1$53 of the first image X1 corresponding to the region 53. Since the transparency of pixels P$_2$53' is 55, the luminance of pixels P$_1$53 is approximately 40 when superimposed. The pixels P$_1$63 of the first image X1 corresponding to the region 63 is similar. The pixels P$_2$61' of the reference image Y is superimposed on the pixels P$_1$61 of the first image X1 corresponding to the oncoming vehicle main body 61. Since the transparency of pixels $P_2 61'$ is 225, the luminance of pixels $P_1 61$ is approximately 180 when superimposed. The pixels $P_1 70$ of the first image X1 corresponding to the pedestrian 70 is similar.

Figure 7:
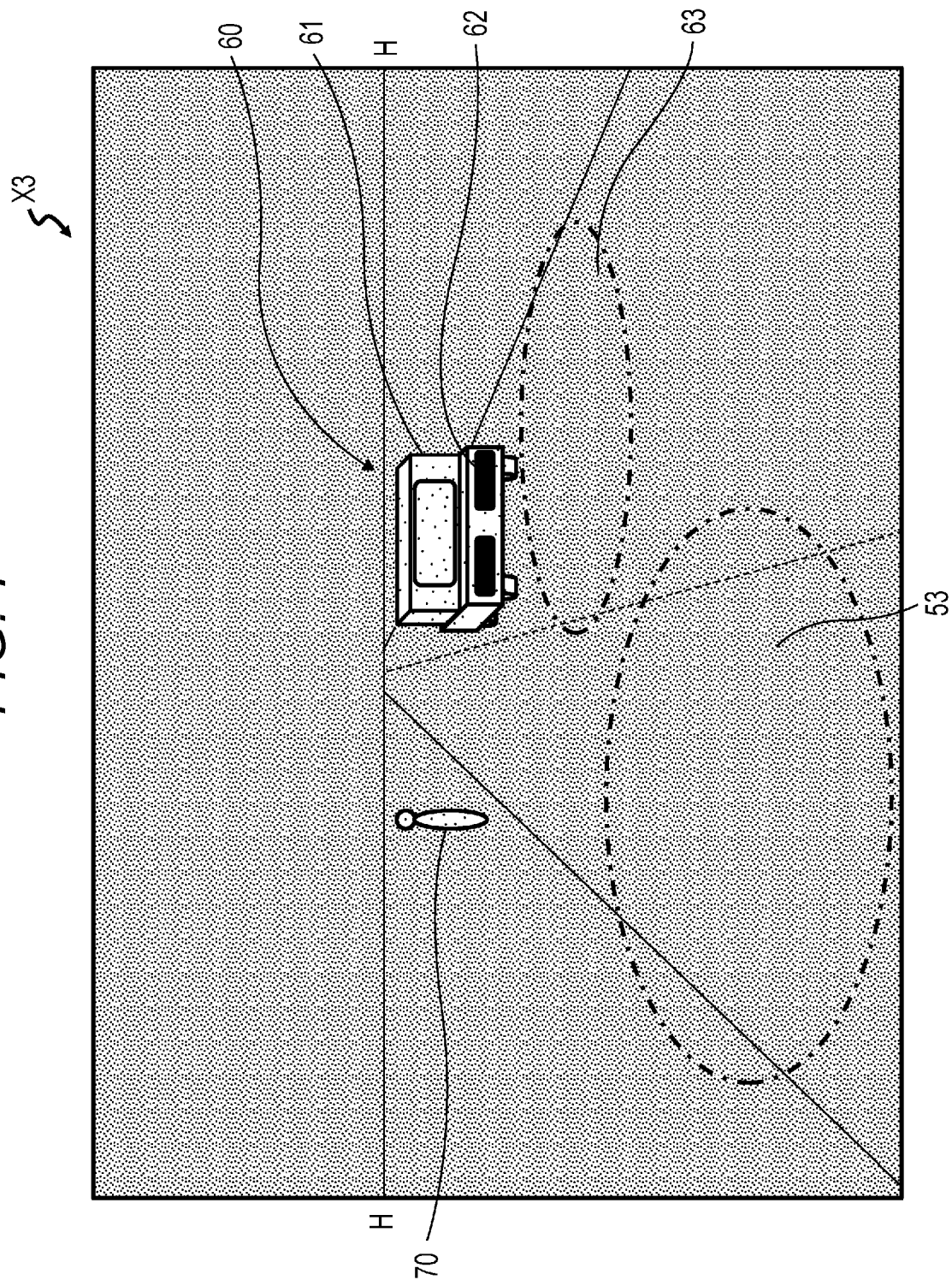
FIG. 7 is a schematic diagram of a third image generated by the vehicular display system.

FIG. 7 is a schematic diagram of the third image X3 generated by the display control unit 43. As shown in FIG. 7, since the pixels $P_2 62$ of the headlamps 62 that were displayed brightest in the second image X2, which is a visible light image, are set to have a low transparency, the corresponding pixels in the third image X3 is displayed dark. In this example, the luminance of the pixels of the headlamps 62 of the third image X3 is extremely low, and thus the headlamps 62 of the third image X3 are not displayed at all. Conversely, since the pixels $P_2 61$ of the oncoming vehicle main body 61 or $P_2 70$ of the pedestrian 70, which are displayed relatively dark in the second image X2, which is a visible light image, are set to have a low transparency, the corresponding pixels of the third image X3 are displayed relatively bright. In this example, the occupant of the vehicle 1 can visually recognize the oncoming vehicle main body 61 or the pedestrian 70 based on the third image X3. Since the pixels $P_2 53$ or the pixels $P_2 63$ of the region 53 or the region 63, which are displayed relatively bright in the second image X2, which is a visible light image, are set to have a low transparency, the corresponding pixels of the third image X3 are displayed relatively dark. In this example, since the luminance of the region 53 or the region 63 of the third image X3 is extremely low, the occupant of the vehicle 1 hardly visually recognizes the region 53 or the region 63.

A vehicular display system will be described in which the present embodiment is not used. In general, the occupant of the vehicle 1 traveling at night can visually recognize the content of the second image X2 (visible light image) shown in FIG. 4 through the windshield. For example, the occupant can visually recognize the headlamps 62 of the oncoming vehicle 60 and the regions 53 and 63, but cannot visually recognize the oncoming vehicle main body 61 and the pedestrian 70. This is because the targets that are illuminated with visible light are limited under poor visibility conditions such as at night or in bad weather. In order to assist visibility, when the first image X1 (near-infrared light image) shown in FIG. 6 is displayed on the HUD 42, the occupant can visually recognize the oncoming vehicle main body 61 and the pedestrian 70 through the HUD 42. However, at the same time, the occupant also visually recognizes the headlamps 62 and the regions 53 and 63 through the HUD 42. A case where the headlamps 62 of the oncoming vehicle 60 and the regions 53 and 63, which are already visually recognized through the windshield, are further displayed on the HUD 42, may be troublesome for the occupant in terms of visibility.

On the other hand, in the present embodiment, the first camera 31 and the second camera 32 include the same imaging range. In the same imaging range, the display control unit 43 reduces the luminance of the pixels of the first image X1 corresponding to the high-luminance pixels of the second image X2 based on the luminance of the second image X2 by visible light. Even when the second image X2 by the visible light contains high-luminance pixels, since the luminance of the pixels of the first image X1 corresponding to the pixels is reduced, the luminance of the corresponding pixels in the generated third image X3 is low and displayed dark. That is, in the third image X3 displayed by the HUD 42, the pixels corresponding to the high-luminance pixels of the second image X2 by the visible light are displayed dark. For example, the headlamps 62 of the oncoming vehicle 60 and the regions 53 and 63 are displayed dark on the HUD 42. Since the headlamps 62 of the oncoming vehicle 60 and the regions 53 and 63, which are already visually recognized through the windshield, are displayed dark on the HUD 42, it is possible to reduce the troublesome visibility. As described above, according to the present embodiment, more excellent night driving visibility assist system (night vision system) can be provided in order to display on the HUD 42 the third image X3 in which the luminance of the pixels of the image X1 corresponding to the second image X2, which is a visible light image, is lowered, compared to a case where the first image X1, which is a near-infrared light image, is displayed on the HUD 42 as it is.

The display control unit 43 reverses the second image X2 such that the luminance of high-luminance pixels is low and the luminance of low-luminance pixels is high, and the level of transparency is set based on the levels of the reversed pixel values. By superimposing the reference image Y and the first image X1 generated in this manner, the highly accurate third image X3 can be generated. Therefore, in the visible region, it is possible to reduce troublesome of visibility due to overlapping of the first image X1 and the second image X2.

The display control unit 43 can adjust the difference in transparency by adjusting the difference in contrast of the second image X2 before setting the transparency. For example, when the difference in contrast of the second image X2 is increased, the difference in luminance between high-luminance pixels and low-luminance pixels is increased, and thus the difference in transparency is also increased. As a result, the display control unit 43 can create the reference image Y in which the boundary between the high-luminance pixels and the low-luminance pixels clearly appears, and the third image X3 in which the boundary between the high-luminance pixels and the low-luminance pixels is further emphasized can be extracted. On the other hand, when the difference in contrast between the high-luminance pixels and the low-luminance pixels is reduced, the difference in transparency is also set smoothly. As a result, the display control unit 43 can express even a fine difference in luminance at the boundary between the high-luminance pixels and the low-luminance pixels in the reference image Y, and can generate the more precise third image X3.

In the third image X3 generated by the display control unit 43, the luminance may be lowered as a whole. However, since the display control unit adjusts the contrast of the third image X3, the luminance of the relatively high-luminance pixels in the third image X3 is increased, and even the luminance of the relatively low-luminance pixels can be set to be high enough to be visually recognized by the occupant of the vehicle 1. Therefore, the third image X3 as a whole does not become extremely dark, and the HUD 42 can be used to display the third image X3 more clearly.

The first lamp 21 that emits near-infrared light is configured to irradiate the range including a part above the horizontal, that is, a far part with the near-infrared light. Therefore, at night or under adverse conditions, even the obstacle at the far part which cannot be visually recognized by the occupant of the vehicle 1 can be irradiated with near-infrared light, and thus the occupant can check the target at the far part, and can improve driving safety.

Second Embodiment

Figure 8:
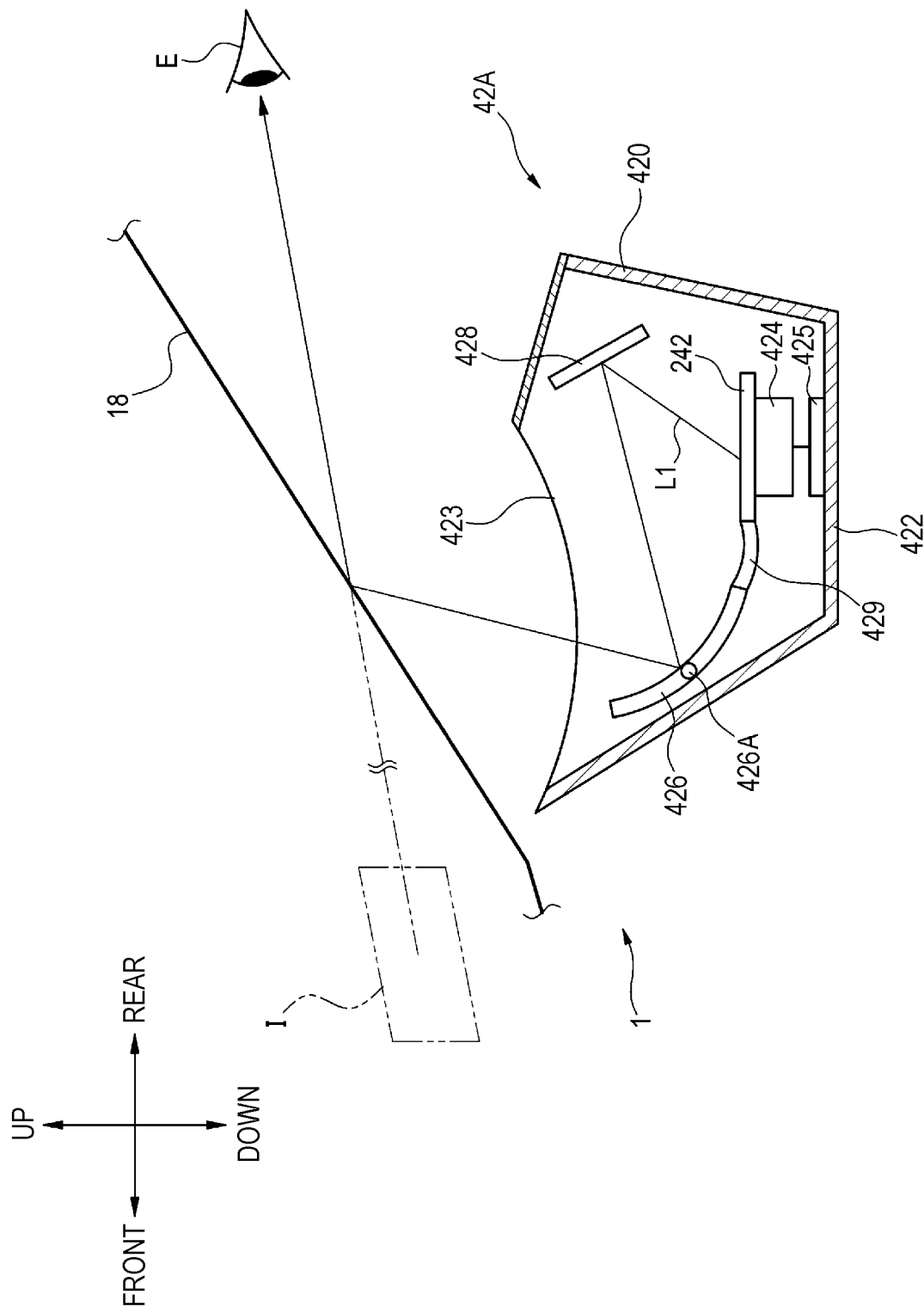
FIG. 8 is a schematic diagram showing a configuration of an HUD according to a second embodiment.

FIG. 8 is a schematic diagram of an HUD 42A according to the second embodiment as viewed from the side of the vehicle 1. FIG. 9 is a schematic diagram of the image generation unit 424, the concave mirror 426, and a connection unit 429 as viewed from above. The HUD 42A is provided in the vehicle 1. For example, the HUD 42A may be disposed in the dashboard of the vehicle 1. In addition, in the description of the second embodiment, descriptions of members having the same reference numbers as those already described in the description of the first embodiment will be omitted for convenience of description. The HUD 42A is an example of an image irradiation device.

The HUD 42A is configured to display a predetermined image. The predetermined image may include a still image or a moving image (video). The HUD 42A functions as a visual recognized interface between the vehicle 1 and the occupant of the vehicle 1. Specifically, the information is displayed as an image such that the predetermined information is superimposed on the real space outside the vehicle 1 (in particular, the surrounding environment in front of the vehicle 1). The information displayed on the HUD 42A is, for example, vehicle travel information related to traveling of the vehicle 1 and/or surrounding environment information related to the surrounding environment of the vehicle 1 (in particular, information related to a target that is present outside the vehicle 1).

As shown in FIG. 8, the HUD main body unit 420 of the HUD 42A has the image generation unit (PGU) 424, the control board 425, the plane mirror 428, the concave mirror 426, and the connection unit 429 inside the housing 422. The concave mirror 426 is an example of a reflection unit.

In this example, as illustrated in FIG. 9, the image generation unit 424 has a frame unit 242 surrounding a display device 241.

The plane mirror 428 is disposed on the optical path of the light emitted from the image generation unit 424. Specifically, the plane mirror 428 is configured to be disposed above the image generation unit 424 and reflect the light emitted from the image generation unit 424 toward the concave mirror 426. The plane mirror 428 has a planar reflecting surface, and reflects the image of the light emitted from the image generation unit 424 and formed into an image at the same magnification.

In this example, the concave mirror 426 includes a rotary shaft 426A, and is configured to be rotatable around the rotary shaft 426A.

The connection unit 429 is configured to connect the image generation unit 424 and the concave mirror 426 to each other. In this example, as illustrated in FIG. 9, the connection unit 429 includes a connection unit that connects the left end of the frame unit 242 of the image generation unit 424 and the left end of the concave mirror 426 to each other, and a connection unit that connects the right end of the frame unit 242 and the right end of the concave mirror 426 to each other.

The connection unit 429 is made of bimetal. Bimetals have the property of deforming according to temperature changes. Specifically, the bimetal is made up of a plurality of metal plates with different coefficients of thermal expansion, and is curved or deforms into a flat shape due to temperature changes. That is, the connection unit 429 is configured to deform in accordance with the temperature change of the surroundings, the deformation of the connection unit 429 causes the concave mirror 426 connected to the connection unit 429 to rotate around the rotary shaft 426A, and the orientation of the reflecting surface is changed.

In the HUD 42A configured as described above, as illustrated in FIG. 8, light L1 emitted from the image generation unit 424 is reflected by the plane mirror 428 and the concave mirror 426 and emitted through the exit window 423 of the HUD main body unit 420. The windshield 18 is irradiated with the light emitted through the exit window 423 of the HUD main body unit 420. A part of the light emitted through the exit window 423 to the windshield 18 is reflected toward the viewpoint E of the occupant. As a result, the occupant recognizes the light emitted from the HUD main body unit 420 as a virtual image (predetermined image) formed at a predetermined distance in front of the windshield 18.

Figure 10:
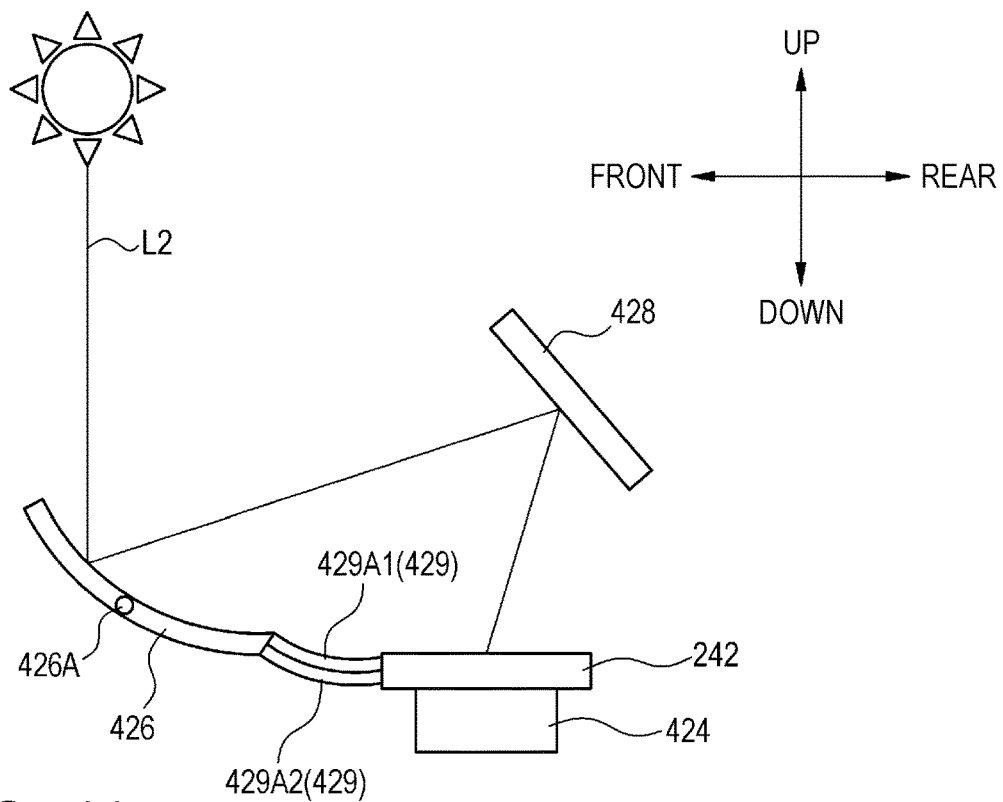
FIG. 10 is a schematic diagram for illustrating an optical path diagram when external light enters the HUD.

Incidentally, as illustrated in FIG. 10, external light L2 such as sunlight incident from the outside of the vehicle may enter the inside of the housing 422 through the exit window 423 of the HUD 42A, be reflected by the concave mirror 426 and the plane mirror 428, and focused on the image generation unit 424. In this case, there is a possibility that the far-infrared rays contained in the external light will cause an excessive temperature rise in the image generation unit 424, and the image generation unit 424 will deteriorate.

Figure 11:
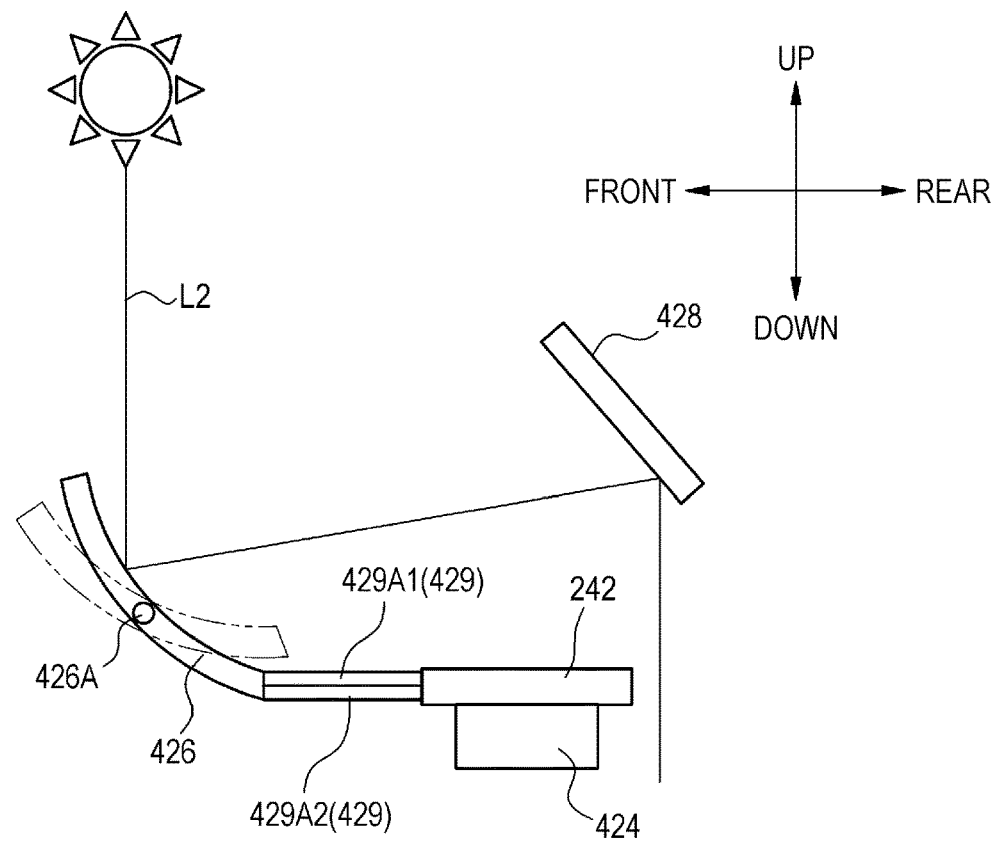
FIG. 11 is a schematic diagram for illustrating an optical path diagram when external light enters the HUD.

On the other hand, when the external light L2 incident from the outside of the vehicle is focused on the image generation unit 424 and the temperature in the vicinity of the image generation unit 424 rises, the connection unit 429 according to the second embodiment deforms as exemplified in FIG. 11. Thereby, the concave mirror 426 is rotated around the rotary shaft 426A, and the orientation of the reflecting surface is changed. As the angle of the reflecting surface of the concave mirror 426 with respect to the reflecting surface of the plane mirror 428 changes in this manner, the external light L2 reflected by the concave mirror 426 is reflected by the plane mirror 428 in a direction different from that of the image generation unit 424. Therefore, it is possible to prevent the external light L2 reflected by the concave mirror 426 and the plane mirror 428 from being incident on the image generation unit 424, and to reduce occurrence of deterioration of the image generation unit 424 caused by the far-infrared rays contained in the external light L2 focused on the image generation unit 424. As a result, the occurrence of heat damage can be prevented.

In the present embodiment, the connection unit 429 made of bimetal can be configured to deform when the temperature in the vicinity of the image generation unit 424 exceeds a predetermined threshold value. For example, the connection unit 429 can be configured to deform when the temperature in the vicinity of the image generation unit 424 is 90° C. or higher.

As described above, the connection unit 429 deforms as the temperature in the vicinity of the image generation unit 424 rises, and as a result, the angle of the reflecting surface of the concave mirror 426 with respect to the reflecting surface of the plane mirror 428 changes, and it is possible to reduce the case where the external light L2 reflected by the plane mirror 428 is incident on the image generation unit 424. On the other hand, the light emitted from the image generation unit 424 and reflected by the plane mirror 428 is not incident on the predetermined position of the concave mirror 426 due to the change in the angle of the reflecting surface of the concave mirror 426 with respect to the reflecting surface of the plane mirror 428. Therefore, the image displayed by the HUD 42A is no longer displayed at the position where the image should be displayed.

However, according to the above configuration, the connection unit 429 is configured not to deform when the temperature in the vicinity of the image generation unit 424 is equal to or lower than the predetermined threshold value. Therefore, the visibility of the image displayed by HUD 42A can be ensured, while reducing deterioration of the image generation unit 424 by the external light L2.

Further, in the present embodiment, the bimetal forming the connection unit 429 can be formed by bonding a metal plate made of a Cr—Ni-MN alloy and a metal plate made of a Ni—Fe alloy. For example, as exemplified in FIG. 10, the connection unit 429 is formed of a bimetal consisting of a metal plate 429A1 made of a Cr—Ni-MN alloy and a metal plate 429A2 made of a Ni—Fe alloy. The connection unit 429 is formed in an upwardly curved state by contraction of the metal plate 429A1 made of a Cr—Ni-MN alloy. On the other hand, for example, when the temperature in the vicinity of the image generation unit 424 reaches 90° C. or higher, the metal plate 429A1 made of a Cr—Ni-MN alloy expands as illustrated in FIG. 11, and accordingly, the connection unit 429 deforms into a flat shape.

According to such a configuration, the connection unit 429 deforms at a temperature close to the upper limit temperature at which the display device constituting the image generation unit 424 can operate normally (for example, approximately 105° C. in the case of a liquid crystal display), and thus the visibility of the image displayed on the HUD 42A can be ensured, while reducing deterioration of the image generation unit 424 by the external light L2.

In addition, in the present embodiment, the frame unit 242 of the image generation unit 424 may be made of metal. According to such a configuration, the temperature rise of the display device 241 of the image generation unit 424 can be transmitted to the connection unit 429 by heat conduction of the frame unit 242.

Figure 12:
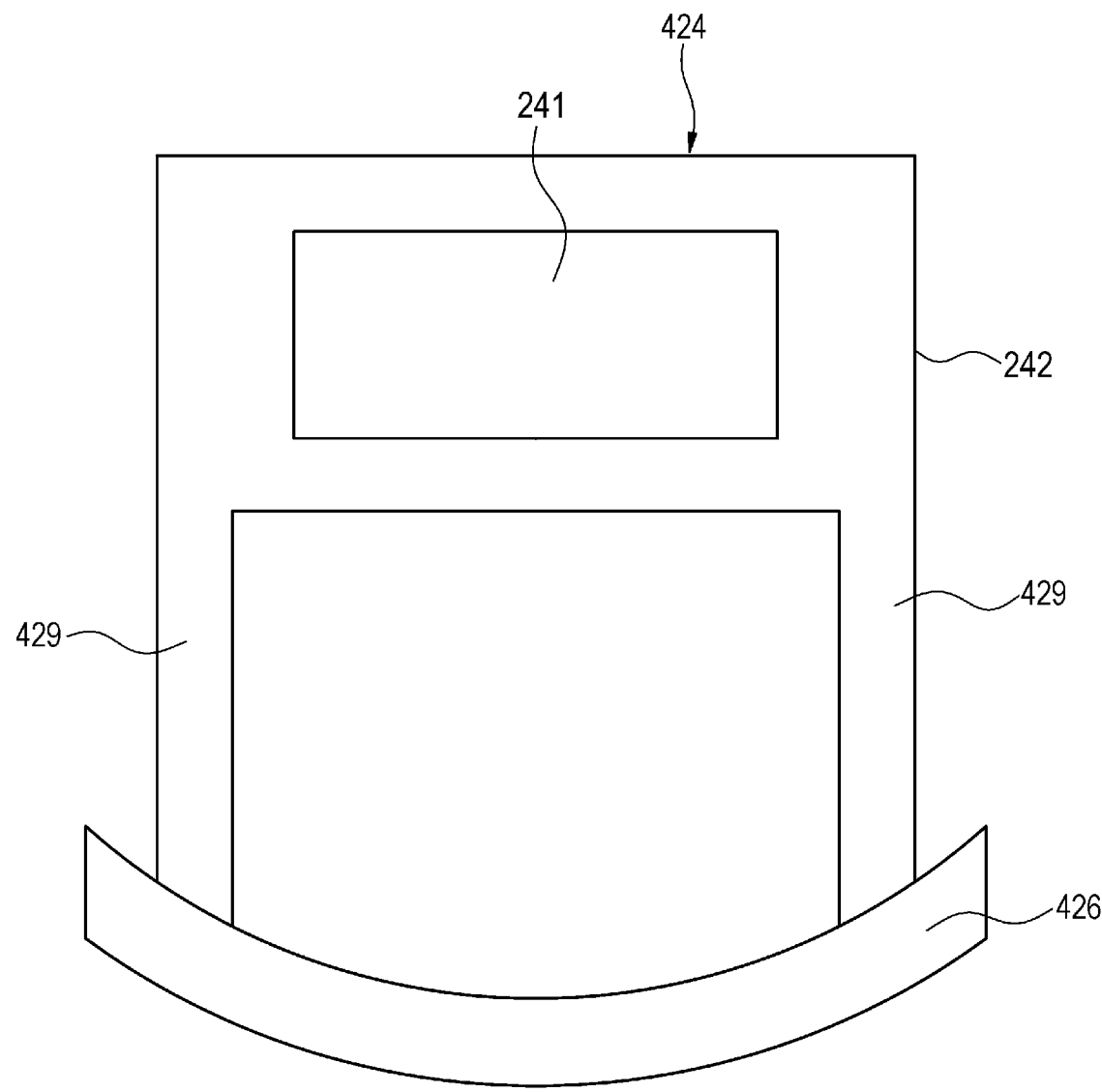
FIG. 12 is a schematic view of a part of the configuration of a modification example of the HUD as viewed from above.

In addition, the frame unit 242 may be formed of bimetal. In this case, as illustrated in FIG. 12, the connection unit 429 and the frame unit 242 may be formed to constitute a single member. That is, the connection unit 429 and the frame unit 242 can have a monolithic structure. According to such a configuration, the frame unit 242 changes as the temperature of the image generation unit 424 rises. Therefore, the angle of the reflecting surface of the concave mirror 426 with respect to the reflecting surface of the plane mirror 428 can change as the temperature of the image generation unit 424 or the temperature in the vicinity thereof rises.

Third Embodiment

Next, an HUD 42B according to the third embodiment will be described with reference to FIGS. 13 to 15. In addition, in the description of the third embodiment, descriptions of members having the same reference numbers as those already described in the description of the second embodiment will be omitted for convenience of description. In addition, in FIG. 13, illustration of the control board 425 is omitted.

The HUD 42B according to the third embodiment is different from the HUD 42A according to the second embodiment, in which the light emitted from the image generation unit 424 is reflected by the plane mirror 428 and the concave mirror 426, in that the light emitted from the image generation unit 424 is reflected by the concave mirror 426.

Figure 13:
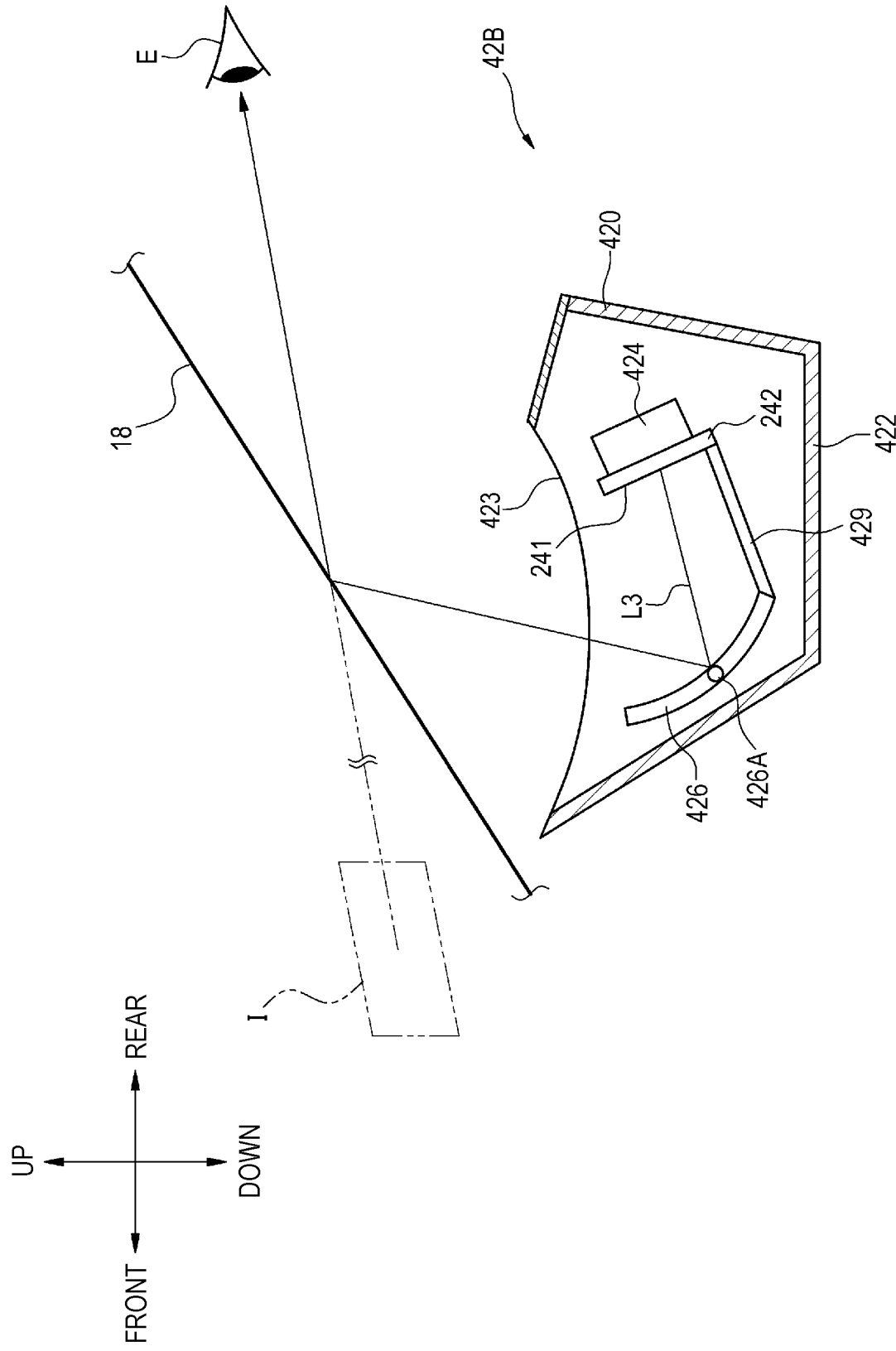
FIG. 13 is a schematic diagram showing a configuration of an HUD according to a third embodiment.

As shown in FIG. 13, the concave mirror 426 is disposed on the optical path of the light emitted from the image generation unit 424. Specifically, inside the housing 422, the concave mirror 426 is disposed in front of the image generation unit 424, and the reflecting surface of the concave mirror 426 faces the light emission surface (display device 241) of the image generation unit 424.

Light L3 emitted from the image generation unit 424 is reflected by the concave mirror 426 and emitted through the exit window 423 of the HUD main body unit 420. The windshield 18 is irradiated with the light emitted through the exit window 423 of the HUD main body unit 420. A part of the light emitted through the exit window 423 to the windshield 18 is reflected toward the viewpoint E of the occupant.

Figure 14:
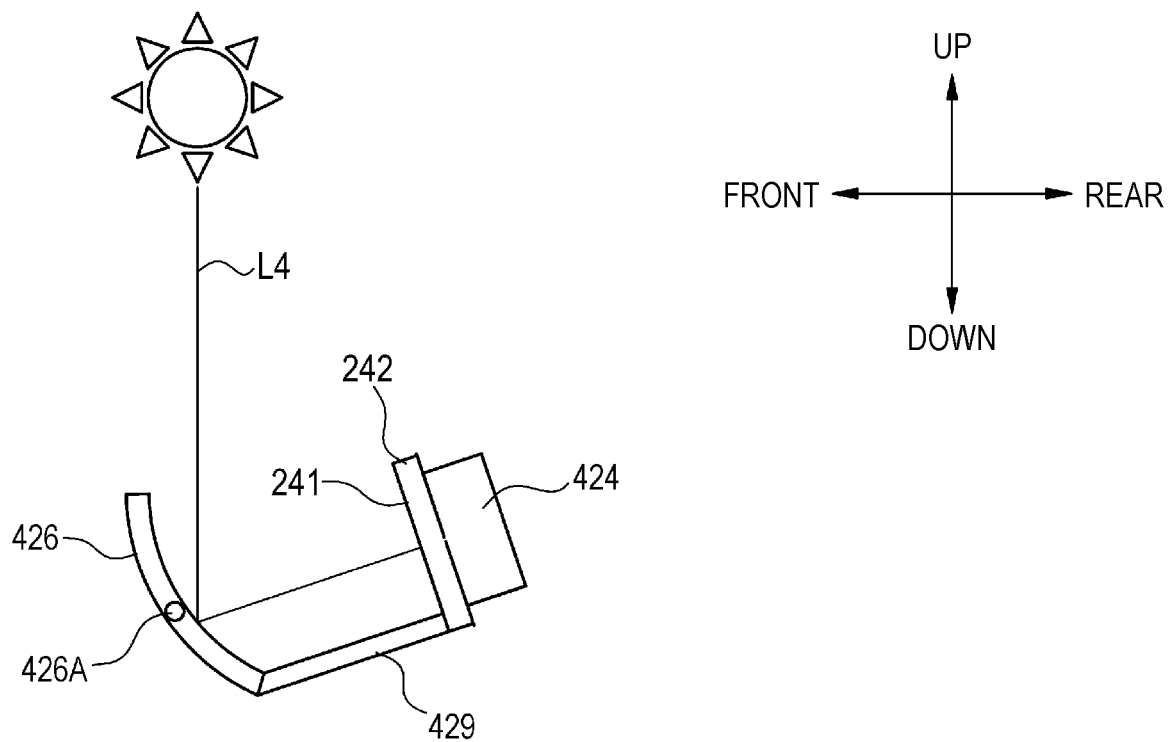
FIG. 14 is a schematic diagram for illustrating an optical path diagram when external light enters the HUD.
Figure 15:
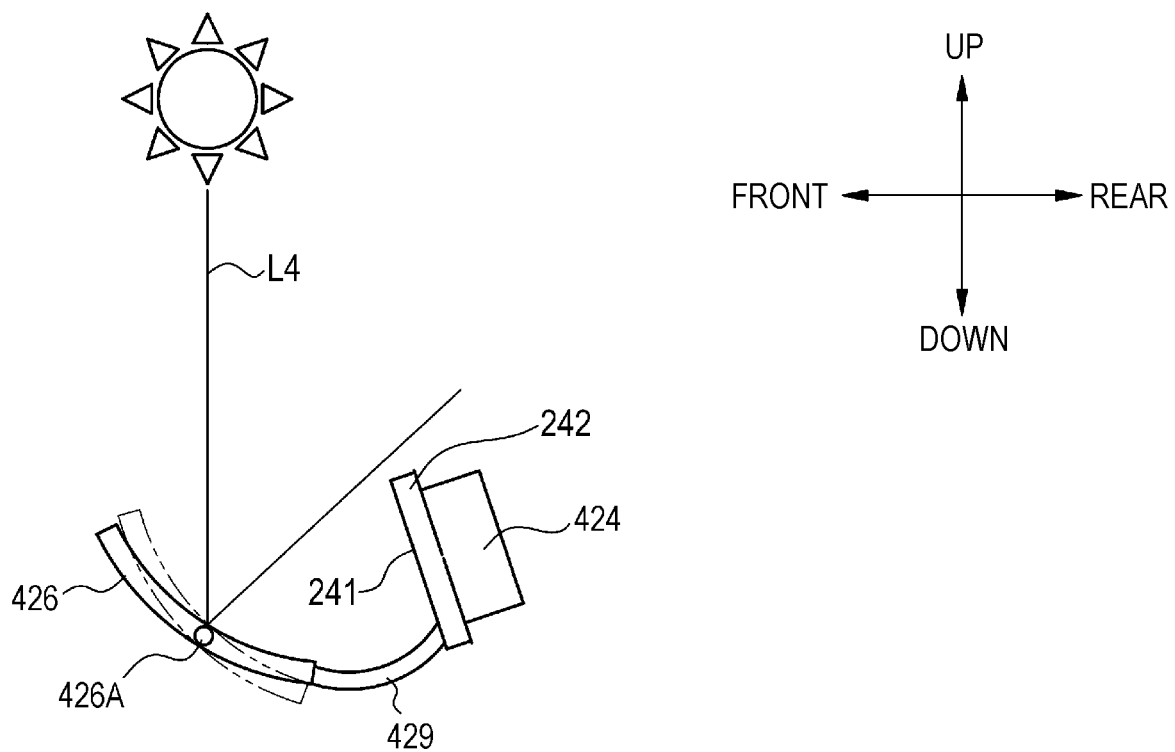
FIG. 15 is a schematic diagram for illustrating an optical path diagram when external light enters the HUD.

On the other hand, as exemplified in FIG. 14, when external light L4 entering the inside of the housing 422 of the HUD 42B is reflected by the concave mirror 426 and focused on the image generation unit 424, and the temperature in the vicinity of the image generation unit 424 rises, the connection unit 429 deforms as illustrated in FIG. 15. Thereby, the concave mirror 426 is rotated around the rotary shaft 426A, and the orientation of the reflecting surface is changed. As the angle of the reflecting surface of the concave mirror 426 with respect to the light emission surface (display device 241) of the image generation unit 424 changes in this manner, the external light L4 reflected by the concave mirror 426 is reflected in a direction different from that of the image generation unit 424. Therefore, it is possible to reduce the case where the external light L4 reflected by the concave mirror 426 is incident on the image generation unit 424, and to prevent the occurrence of heat damage.

Although the embodiments of the present disclosure have been described above, it goes without saying that the technical scope of the present disclosure should not be construed to be limited by the description of the present embodiments. It should be understood by those skilled in the art that the present embodiments are merely an example, and that various modifications of the embodiments are possible within the scope of the invention described in the claims. The technical scope of the present disclosure should be determined based on the scope of the invention described in the claims and their equivalents.

Figure 16:
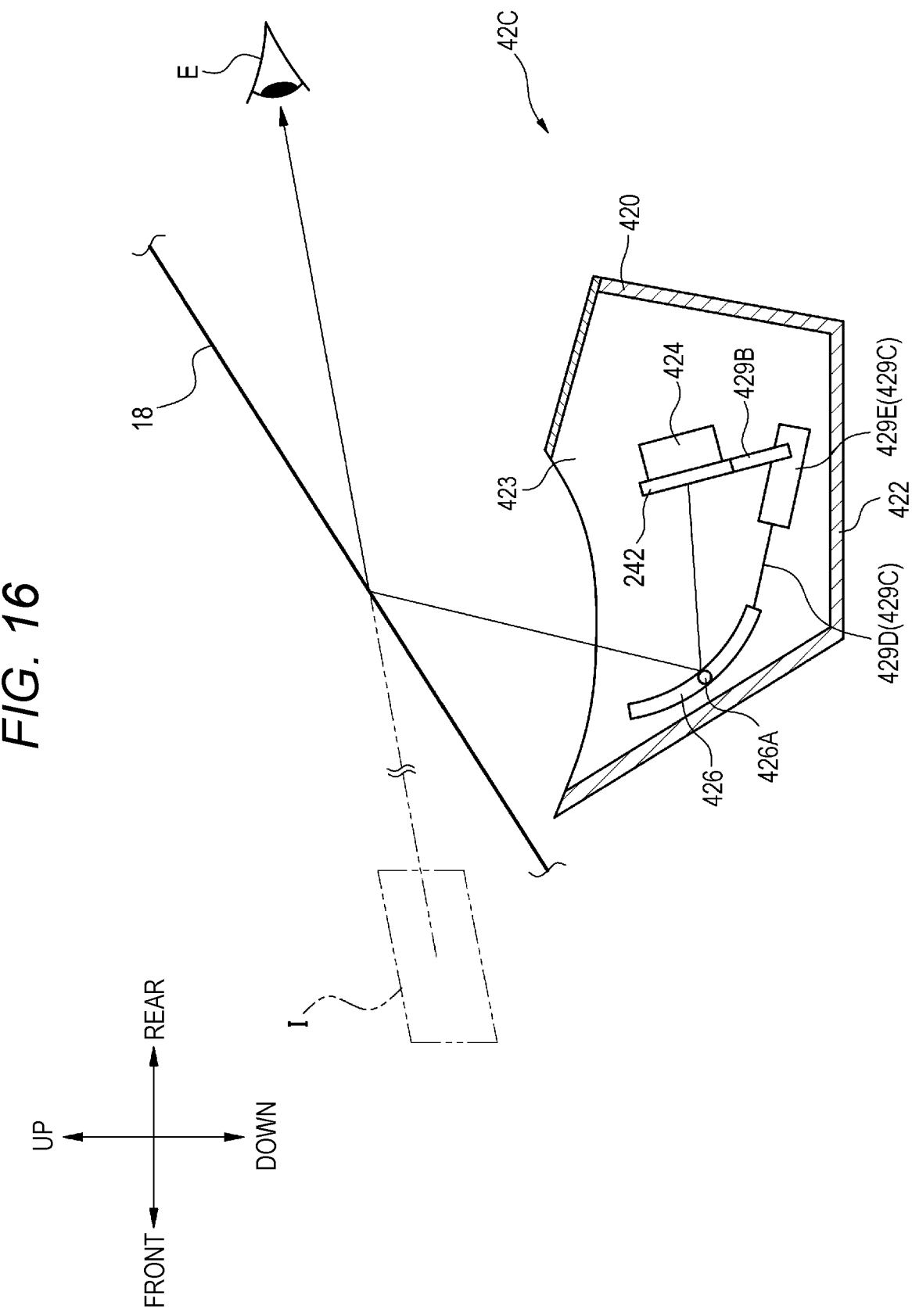
FIG. 16 is a schematic diagram showing a configuration of an HUD according to a modification example.

In the second and third embodiments described above, the connection unit 429 is made of bimetal. However, a structure in which at least a part of the connection unit 429 is made of bimetal can also be adopted. As illustrated in FIG. 16, the connection unit 429 has a coupling unit 429B and a driving unit 429C. The coupling unit 429B is made of bimetal and configured to couple the driving unit 429C and the image generation unit 424 to each other.

The driving unit 429C is connected to the concave mirror 426. The driving unit 429C rotates the concave mirror 426 around the rotary shaft 426A based on a control signal transmitted from the control board 425 (not shown) to change the orientation of the reflecting surface of the concave mirror 426.

Figure 17:
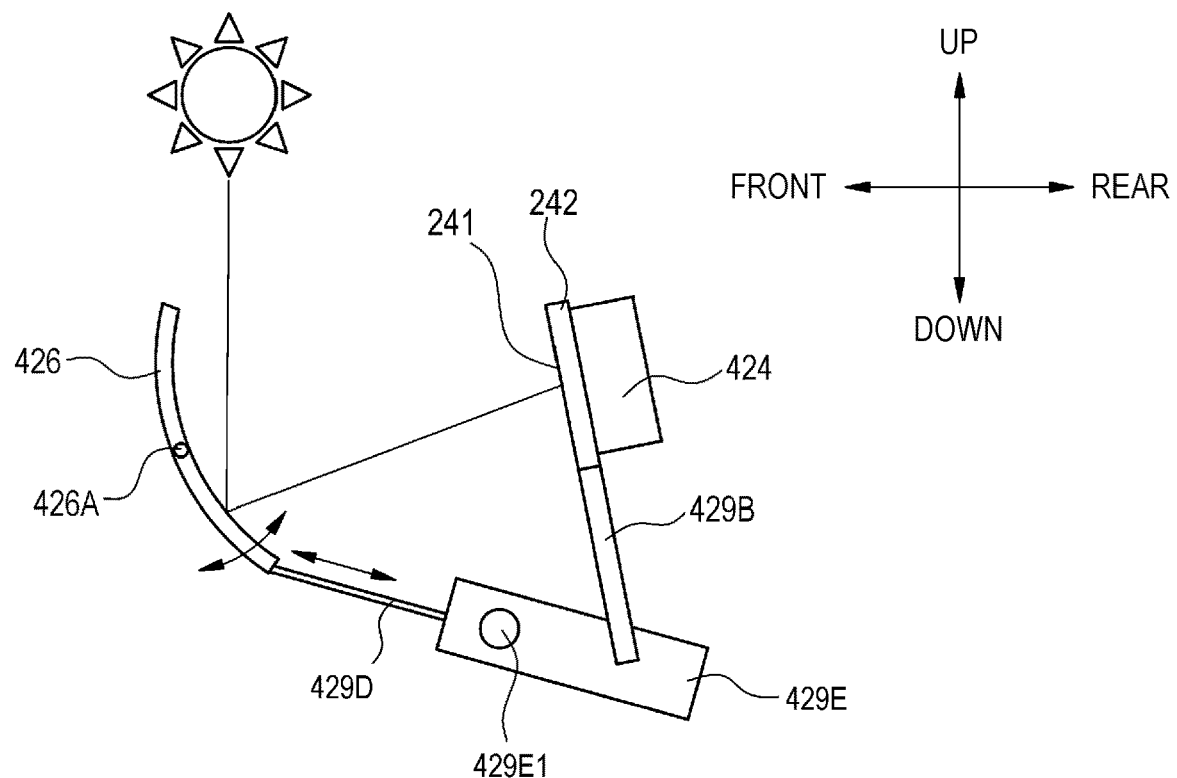
FIG. 17 is a schematic diagram for illustrating an optical path diagram when external light enters the HUD.

Specifically, as illustrated in FIGS. 16 and 17, the driving unit 429C has a shaft unit 429D and a moving mechanism 429E. One end of the shaft unit 429D is connected to the concave mirror 426. The moving mechanism 429E includes, for example, a worm gear and a DC motor, and moves the shaft unit 429D in the shaft direction. By moving the shaft unit 429D in the shaft direction, the concave mirror 426 is rotated around the rotary shaft 426A.

Figure 18:
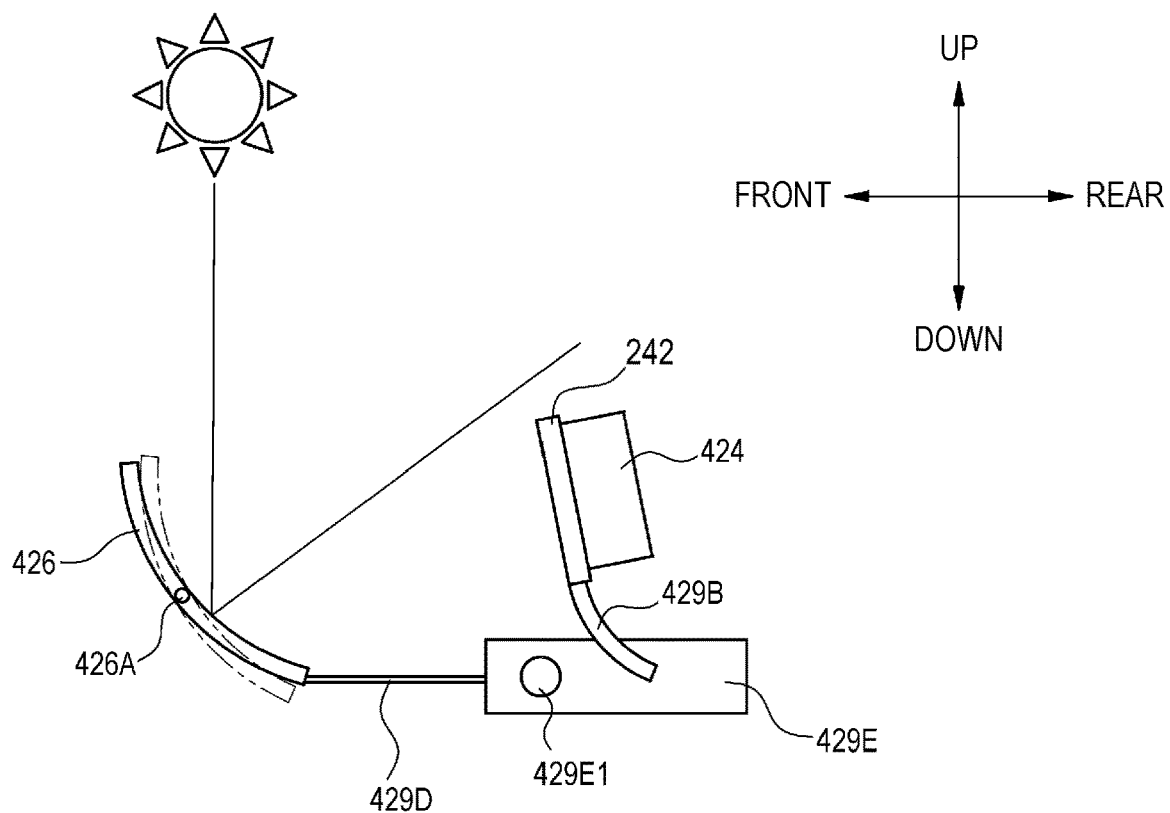
FIG. 18 is a schematic diagram for illustrating an optical path diagram when external light enters the HUD.

As exemplified in FIG. 17, when the temperature in the vicinity of the image generation unit 424 rises as the external light entering the inside of the housing 422 of an HUD 42C is reflected by the concave mirror 426 and focused on the image generation unit 424, the coupling unit 429B deforms as illustrated in FIG. 18. Due to the deformation of the coupling unit 429B, the moving mechanism 429E connected to the coupling unit 429B is moved together with the shaft unit 429D. As a result, the concave mirror 426 rotates around the rotary shaft 426A to change the orientation of the reflecting surface, and the angle of the reflecting surface of the concave mirror 426 with respect to the display device 241 of the image generation unit 424 changes. Therefore, it is possible to reduce the case where the external light reflected by the concave mirror 426 is incident on the image generation unit 424, and to prevent the occurrence of heat damage.

In addition, the moving mechanism 429E has a movable shaft 429E1, and the movable shaft 429E1 may be configured to be movable in a rail (not shown). That is, the movable shaft 429E1 of the moving mechanism 429E moves in the rail as the coupling unit 429B deforms. Accordingly, it is possible to easily position the driving unit 429C.

In the second and third embodiments described above, the connection unit 429 connects the image generation unit 424 and the concave mirror 426 to each other. However, in the second embodiment, connection 429 may be configured to connect the image generation unit 424 and the plane mirror 428 to each other. In the third embodiment, the concave mirror 426 can be configured as a plane mirror, and the connection unit 429 can be configured to connect the image generation unit 424 and the plane mirror.

In the above-described second embodiment, the connection unit 429 is configured to deform from a curve into a planar shape as the temperature rises. However, the connection unit 429 may be configured to deform from a planar shape into a curved shape as the temperature rises. Similarly, in the above-described third embodiment, the connection unit 429 is configured to deform from a planar shape into a curve as the temperature rises. However, it may be configured such that it deforms from a curve into a planar shape as the temperature rises.

In the above second and third embodiments, the image generation unit 424 has the frame unit 242 surrounding the display device 241 and the connection unit 429 is connected to the frame unit 242. However, the connection unit 429 may be connected to other parts of the image generation unit 424. For example, in FIG. 8, the connection unit 429 may be connected to a lower part of the image generation unit 424 remote from the display device 241.

In the second and third embodiments described above, the orientation of the reflecting surface of the concave mirror 426 is changed as the concave mirror 426 rotates around the rotary shaft 426A. However, as long as the angle of the reflecting surface of the concave mirror 426 with respect to the reflecting surface of the plane mirror 428 and the light emission surface of the image generation unit 424 changes as the concave mirror 426 is displaced, other configurations can be adopted.

In the above-described second and third embodiments, the light emitted from the image generation unit 424 is reflected by the concave mirror 426 and is emitted onto the windshield 18. However, for example, the light reflected by the concave mirror 426 may be emitted to a combiner (not shown) provided inside the windshield 18. The combiner includes, for example, transparent plastic discs. A part of the light emitted from the image generation unit 424 of the HUD main body unit 420 to the combiner is reflected toward the viewpoint E of the occupant in the same manner as when the windshield 18 is irradiated with light.

The present application is based on, and claims priority from Japanese Application No. 2020-153909, filed Sep. 14, 2020 and Japanese Application No. 2020-190155, filed Nov. 16, 2020, the disclosures of which are hereby incorporated by reference herein in their entirety.

The invention claimed is:

1. A vehicular display system provided in a vehicle comprising:
    a first lamp configured to irradiate an outside of the vehicle with near-infrared light;
    a second lamp configured to irradiate the outside of the vehicle with visible light;
    a first camera configured to capture a first image of the outside of the vehicle irradiated by the first lamp;
    a second camera configured to capture a second image of the outside of the vehicle irradiated by the second lamp, the second camera including an imaging range of the first camera;
    a control unit configured to generate a third image in which a luminance of pixels of the first image corresponding to pixels of the second image is reduced, based on a luminance of the second image; and
    a head-up display configured to display the third image generated by the control unit;
    wherein the control unit is configured to generate a reference image in which a luminance of high-luminance pixels and a luminance of low-luminance pixels in the second image are relatively reversed, high transparency is set for pixels with high luminance, and low transparency is set for pixels with low luminance, and
    wherein the control unit is configured to generate the third image by superimposing the reference image and the first image.

2. The vehicular display system according to claim 1, wherein
    the control unit is configured to adjust contrast of the second image before setting transparency.

3. The vehicular display system according to claim 1, wherein
    the control unit is configured to adjust contrast of the third image.

4. The vehicular display system according to claim 1, wherein
    the first lamp is configured to irradiate a range including a part above the horizontal with the near-infrared light.

* * * * *